United States Patent [19]

Mair et al.

[11] 3,988,951

[45] Nov. 2, 1976

[54] FOUR WHEEL DRIVE TRANSMISSION

[75] Inventors: Alex C. Mair, Bloomfield Hills; Calvin F. Lundbom, Southfield, both of Mich.

[73] Assignee: General Motors Corporation, Detroit, Mich.

[22] Filed: Mar. 12, 1975

[21] Appl. No.: 557,482

[52] U.S. Cl. .................................. 74/864; 74/645; 74/682; 74/731; 74/869; 180/70 R
[51] Int. Cl.² ..................................... B60K 41/18
[58] Field of Search ............ 74/645, 682, 695, 705, 74/720.5, 864, 865, 867, 868, 869, 740, 745, 730, 731; 180/44 R, 70 R, 49, 77 R

[56] References Cited
UNITED STATES PATENTS

| | | | |
|---|---|---|---|
| 3,039,327 | 6/1962 | Breting | 74/720.5 |
| 3,804,191 | 4/1974 | Golan et al. | 180/77 R X |
| 3,822,765 | 7/1974 | Heller et al. | 79/720.5 X |

*Primary Examiner*—Samuel Scott
*Assistant Examiner*—Lance W. Chandler
*Attorney, Agent, or Firm*—A. M. Heiter

[57] ABSTRACT

A four wheel drive automatic transmission assembly having an input driving a fluid torque converter which is connected to drive through a three forward speed and reverse drive planetary front transmission to drive the front wheels and through a low forward speed and reverse drive rear transmission to drive the rear wheels. The rear transmission has the same components for the low forward and reverse drives as the front transmission has for the same drives. The control system has a manual control providing in neutral position a positive neutral in both transmissions, in drive position an automatic speed and torque demand control of the three forward speeds of the front transmission with a one-way first and second speed and a two-way third speed drive and positive neutral in the rear transmission, in intermediate position two-way second speed drive and at very low speeds a downshift to one-way first speed of the front transmission and positive neutral in the rear transmission, in low position two-way drive in the first speed of the front transmission and one-way drive in the first speed of the rear transmission and in reverse position two-way reverse in the front transmission and two-way reverse in the rear transmission. This provides normal front wheel automatic drive in drive and intermediate positions and four wheel drive, two-way to the front wheels and one-way to the rear wheels, in low position and two-way four wheel drive in reverse. In modifications first speed four wheel drive, one-way to both the front and rear wheels is also provided in intermediate range and in both intermediate and drive ranges.

11 Claims, 5 Drawing Figures

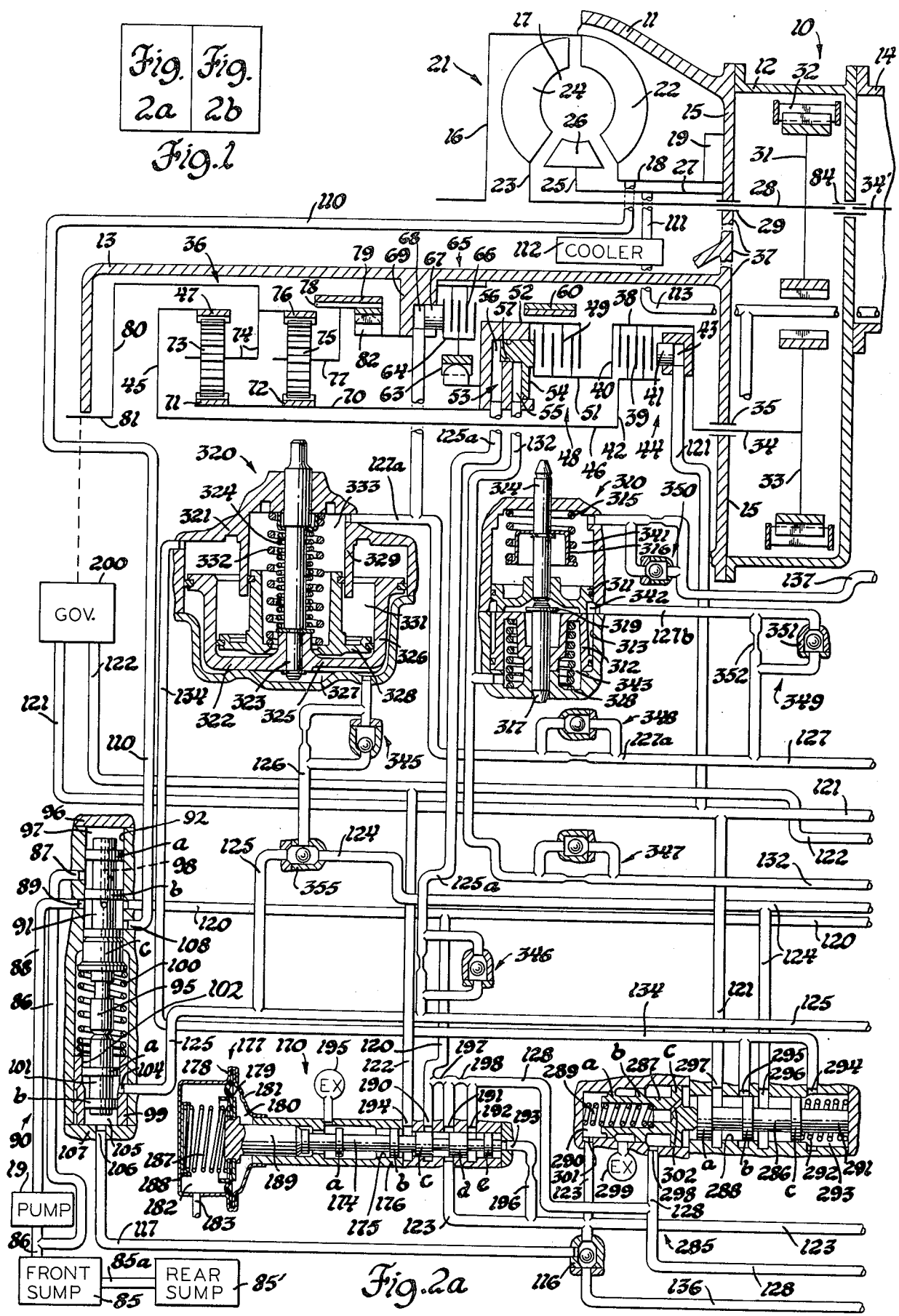

FOUR WHEEL DRIVE TRANSMISSION

This invention relates to transmissions having two wheel and four wheel drive operation phases and controls therefor.

The transmission assembly has a full time or main transmission for driving the main output to the main driving wheels and a part time or auxiliary transmission for driving the auxiliary output to the auxiliary driving wheels and controls operative in response to manual selection to provide automatic multispeed ratio speed responsive shift control of the main transmission and neutral in the automatic transmission and to provide low speed ratio drive in both transmissions for four wheel drive. The four wheel drive may selectively be a two-way drive in one transmission and a one-way drive in the other transmission or a one-way or two-way drive in both transmissions. Also, either a two or four wheel first speed drive may be selected. The auxiliary transmission is the same as the low and reverse drive portions of the main transmission but omits parts only needed for higher speed drives. One automatic control system is used for both transmissions. The main transmission provides a one-way and a two-way low speed ratio drive and higher speed ratio drives and the auxiliary transmission provides a one-way low speed ratio drive. The joint control system provides in automatic two wheel drive position automatic speed responsive shifting between the one-way low speed drive and higher speed drives in the main transmission and neutral in the auxiliary transmission and in low four wheel drive position two-way low speed drive in the main transmission and one-way low speed drive in the auxiliary transmission.

In modifications a four wheel drive having a one-way drive in both transmissions is provided in first speed of the intermediate range or the intermediate and drive ranges with automatic speed responsive upshifting and a change to two wheel drive by the main transmission.

The four wheel drive automatic transmission assembly has an input driving a fluid torque converter which is connected to drive through a three forward speed and reverse drive planetary main transmission to drive the main or front wheels and through a low forward speed and reverse drive auxiliary transmission to drive the auxiliary drive or rear wheels. The auxiliary transmission has the same drive components for the one-way low forward and two-way reverse drives as the main transmission has for the same drives. The main transmission has a forward and a direct-reverse fluid actuated clutch, a one-way and a two-way intermediate fluid actuated brake, a low-reverse fluid actuated brake and a mechanical one-way brake for one-way low drive. In the auxiliary transmission the intermeidate brakes are omitted and the direct-reverse clutch and low-reverse brake are only used in reverse. Only the main transmission control system is used and main transmission control pressures are used to control the auxiliary transmission. A first control system has a manual control providing in neutral position a positive neutral in both transmissions, in drive position an automatic speed and torque demand control of the three forward speeds of the main transmission with a one-way first and second speed and a two-way third speed drives and positive neutral in the auxiliary transmission, in intermediate position two-way second speed drive and at very low speeds a downshift to one-way first speed of the main transmission and positive neutral in the auxiliary transmission, in low position the main transmission low range control pressure is also supplied to the auxiliary transmission to provide two-way drive first speed in the main transmission and one-way drive first speed in the auxiliary transmission and in reverse position two-way reverse in the main transmission and two-way reverse in the auxiliary transmission. This provides normal main or front wheel automatic drive in intermediate and drive manual valve positions and four wheel drive, two-way to the main or front wheels and one-way to the auxiliary or rear wheels, in low manual valve position and two-way four wheel drive in reverse.

A second control system has the intermediate range control pressure connected to the auxiliary transmission to provide in intermediate range manual valve position one-way first speed drive in both transmissions for four wheel drive. The two wheel drive in drive range and the four wheel drive in low range are the same as in the above first control system. The operator by selecting low, intermediate or drive range may respectively provide a four wheel first speed drive with two-way drive to the main wheels and one-way drive to the auxiliary wheels, a four wheel one-way first speed drive to both sets of wheels and a two wheel first speed drive.

A third control system in which drive range control pressure is connected to the auxiliary transmission is like the above second system but in drive range also provides four wheel drive as in intermediate so four wheel first speed drive is provided in all ranges.

These and other features and advantages of this invention will be apparent from the following specification and drawings, in which:

FIG. 1 shows the arrangement of FIGS. 2a and 2b.

FIG. 2a is a schematic drawing of a portion of a transmission and control system.

Figure 2B:
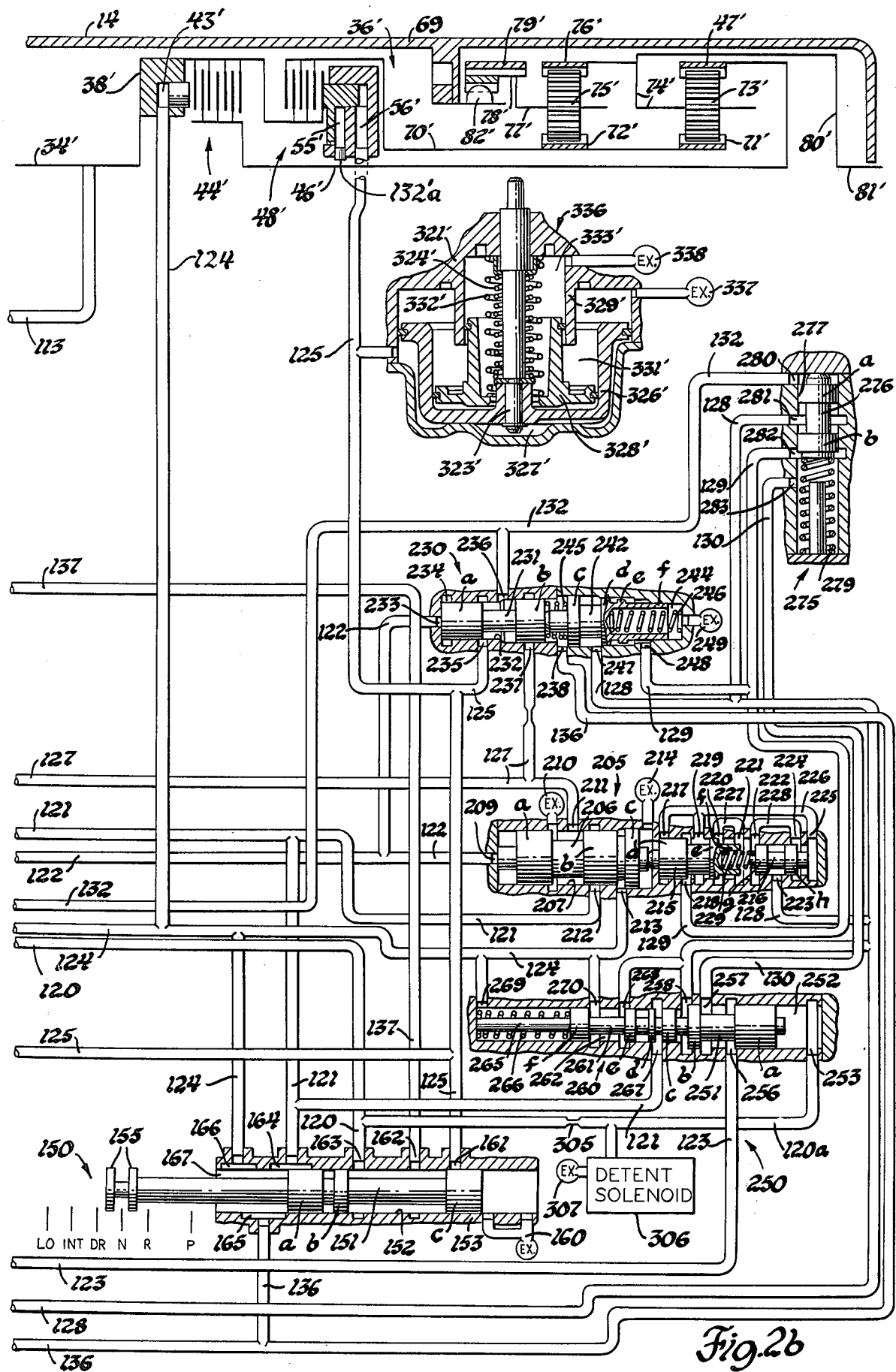
FIG. 2b is a schematic diagram of the remainder of the transmission and control system showing when arranged with FIG. 2a as shown in FIG. 1, the complete transmission and control system.
Figure 3:
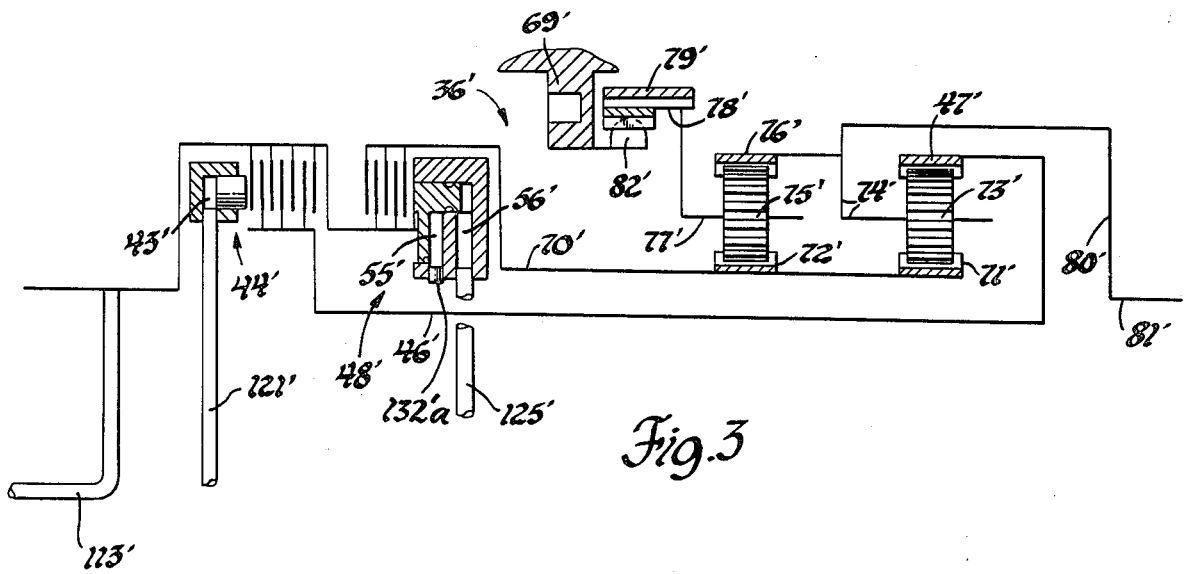

FIG. 3 schematically shows a first modification of a portion of the FIG. 2a and 2b transmission and control system.

Figure 4:
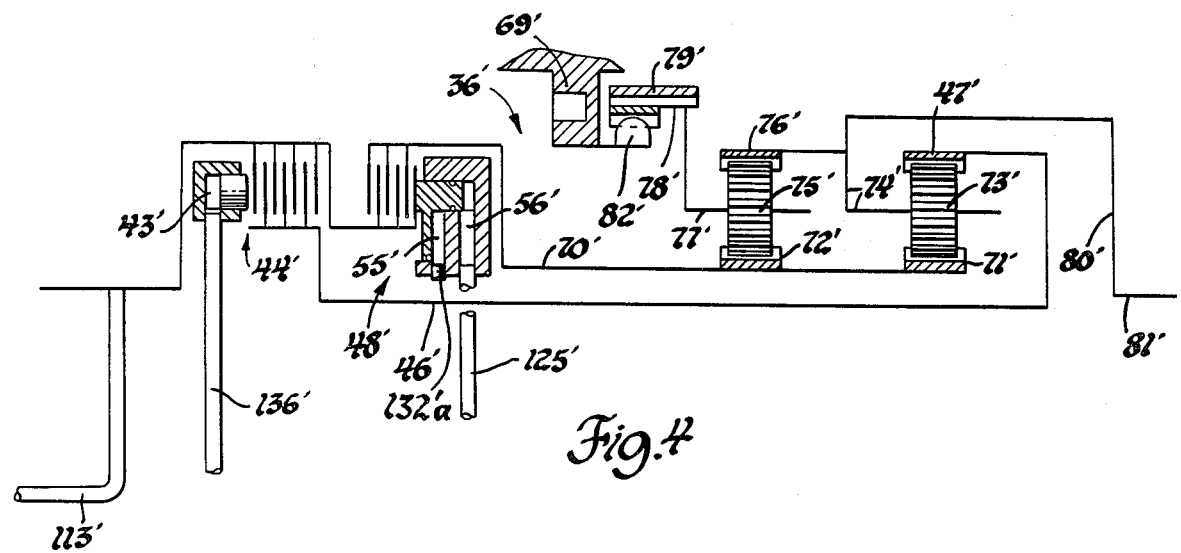

FIG. 4 schematically shows a second modification of a portion of the FIG. 2a and 2b transmission and control system.

Referring to FIGS. 2a and 2b, the transmission gearing arrangement provides three forward speeds and a reverse front wheel drive and forward speed and a reverse rear wheel drive for four wheel drives. The transmission includes housing assembly 10 having a hydrodynamic torque converter enclosing portion 11 conventionally secured to an engine, not shown, a transfer drive enclosing portion 12, a front planetary gearing unit enclosing portion 13 and a rear planetary gearing unit enclosing portion 14. The torque converter housing portion 11 has a rear wall 15. An engine driven rotary housing cover or input member 16 encloses a fluid chamber 17. Cover 16 is connected by means of a sleeve 18 to drive gear pump 19 whenever the vehicle engine is operating. The pump is secured on support wall 15 and supplies fluid under pressure to the control and lubrication system.

The hydrodynamic torque converter unit 21 has impeller vanes 22 mounted on the inside of housing 16, a turbine vane support member or hub 23 having turbine vanes 24 thereon, and a reaction hub 25 having reaction vanes 26 thereon disposed intermediate the fluid discharge of the turbine and fluid entrance to the impeller. Hub 25 and vanes 26 may be fixed or permitted free forward rotation by means of a one-way brake (not shown) disposed between hub 25 and a ground sleeve 27 grounded to support wall 15. The turbine hub 23 is splined to and drives torque converter output or transmission gearing power input shaft 28. The shaft 28 is conventionally rotatably supported by bearing 29 on wall 15 and a bearing (not shown) on round sleeve 27 and main sprocket 31. The sprocket 31 drives the chain 32 which drives the sprocket 33 splined to the front transmission input shaft 34 which is mounted by bearing 35 on wall 15 to drive the front drive gearing unit or transmission 36 in housing portion 13. It is preferred that the torque converter housing portion 11, the front gearing unit housing portion 13 and the supporting wall 15 be made as a one piece front housing 37 as shown diagrammatically with parts broken away to indicate that converter output shaft 28 and front transmission input shaft 34 are spaced apart sufficiently to provide clearance between the completely circular torque converter housing portion 11 and circular front transmission housing portion 13 in FIG. 2a and shown in more detail in a section with true spacing between these shafts in Griffel U.S. Pat. No. 3,360,998, patented Jan. 2, 1968. In the front transmission gearing 36, a clutch housing 38 is splined to shaft 34 for rotation therewith. A series of clutch discs 39 are adapted to be engaged when forced against a clutch disc backing member 40 fixed to drum 38 by means of piston 41. Alternate discs 39 are splined for rotation with and axial movement on clutch housing 38 and intermediate clutch discs 39 are splined for rotation with and axial movement on a clutch drum hub 42.

The clutch drum housing 38 is shaped to provide a cylinder chamber 43 for piston 41 to receive fluid under pressure from drive range passage 121 to actuate this forward clutch 44. A two chamber piston and cylinder construction as shown in this type gearing in the Winchell et al U.s. Pat. No. 3,321,056, patented May 23, 1967, may be used for cushioned engagement and quick release of the forward clutch.

Forward clutch hub 42 is splined to and drives an intermediate shaft 46 when forward clutch 44 is engaged. A ring gear 47 has a hub 45 splined to shaft 46 for rotation therewith. The third ratio or direct and reverse clutch 48 has a series of clutch discs 49 with alternate discs splined on an extension drum 51 of clutch backing member 40 of clutch drum 38 are adapted to be engaged to and released from the intermediate clutch discs splined to a clutch drum 52. Clutch drum 42 is shaped to include a stepped cylinder 53 which cooperates with a stepped piston 54 to provide two chambers 55 and 56 adapted to receive fluid pressure for engaging clutch discs 49. The inner third ratio or direct drive chamber 55 has a smaller area than chamber 56 and is supplied with fluid for direct or third ratio drive forward application. Larger area outer chamber 56 is supplied with fluid for reverse operation. A one-way seal 57 at the step between the chambers prevents flow of fluid from chamber 55 to chamber 56, but permits flow of fluid from chamber 56 to chamber 55. Conventional seals seal the outer and inner diameters of the stepped piston 54 to seal the outer diameter of the outer chamber 56 and the inner diameter of the inner chamber 55. Only the inner chamber 55 is supplied with fluid and used for applying clutch 48 to establish direct drive, while both chambers 55 and 56 are supplied with fluid by supply from reverse passage 125a directly to chamber 56 and supply through one-way seal 57 and direct supply from direct clutch passage 132 to chamber 55 to establish reverse. Thus the direct and reverse clutch is engaged with a capacity matching the low torque requirements for establishing direct or third drive and the relatively high torque requirements for establishing reverse drive for smooth engagement of both drives.

A second drive brake band 60 is provided on the external cylindrical surface of clutch drum 52 and may be engaged to prevent rotation of clutch drum 52 when operating in overrun or one-way second gear, to provide downhill engine braking in two-way second gear drive.

The clutch drum 52 is connected to the inner race of one-way brake sprag 63 which has an outer race connected to the drum 64 of second friction brake 65. Brake 65 has discs 66 with intermediate discs splined for rotation with and axial movement on drum 64 and alternate stationary discs splined for axial movement on housing 13. The brake 65 may be applied by engaging the discs with a piston 67 in response to pressure in cylinder chamber 68 in cylinder and support member 69 fixed to housing 13. With the brake 65 engaged, one-way brake 63 is effective to prevent reverse rotation of clutch drum 52 and ineffective to permit forward rotation of drum 52 for one-way second drive. Clutch drum 52 is splined to a sleeve shaft 70 which in turn is splined to a pair of sun gears 71 and 72. A planet carrier 74 support a planet gear 73 in mesh with sun gear 71 and bring gear 47 and also supports a ring gear 76. A second planet carrier 77 supports a planet gear 75 in mesh with sun gear 72 and ring gear 76. A cylindrical surface or brake drum 78 on carrier 77 may be engaged by a brake band 79 to prevent rotation of planet carrier 77. Band 79 is applied to establish reverse drive and low range first ratio forward two-way drive. Planet carrier 74, ring gear 76 and connecting drum and flange 80, rotate as a unit with and drive power delivery or output shaft 81. A one-way first drive brake 82 is disposed between brake drum 78 and fixed support 69.

The rear drive gearing or transmission unit 36' is located in the rear gearing housing portion 14 which is bolted to the rear face of the transfer drive housing portion 12 and is constructed of the identical parts used in the front transmission 36 which are required in the rear transmission unit, so the same reference numerals primed have been used and reference is made to the above description of the front unit 36. The torque converter output shaft 28 is drive connected by an internally splined sleeve 84 to the input shaft 34' which drives the clutch housing 38' for the forward clutch 44' driving intermediate shaft 46' and direct reverse clutch 48' driving sleeve shaft 70' and the sun gears 71', 72' of the same gearing which drives output shaft 81'. The first reverse brake band 79' and one-way first brake 82' grounded to the housing 14 by the same cylinder and support member 69' is used. Since intermediate ratio in the rear transmission unit is not used, the piston 67, brake 65, one-way brake 63 and band 60 are omitted. Since clutch 48' is only used for reverse the center seal like center seal 57 between the two chambers 55', 56' is omitted so both chambers are in full communication at all times and reverse pressure enters both chambers 55', 56' and the omitted port for drive passage 132 is blocked by plug 132'a.

The above described forward clutches 44 and 44', direct and reverse clutches 48 and 48', second brake 65 second brake band 60 and first reverse brake bands 79, 79' are friction engaging or establishing ratio drive devices. The clutches have conventional retraction springs (not shown). The chamber 43 or outer chamber, if two chambers as shown in the above U.S. Pat. No. 3,321,056, of forward clutches 44 and 44' and the outer chamber 56 of clutches 48 and 48' are rotary clutch chambers and have a ball dump valve (not shown) as disclosed in Fisher U.S. Pat. No. 2,730,512 patented Apr. 3, 1956.

OPERATION OF THE DRIVE ARRANGEMENT

The transmission drive assembly so far described affords neutral, one-way or two-way first, one-way or two-way second and two-way third forward drive ratios, and a two-way reverse drive ratio in the front unit 36 and one-way first forward drive ratio and two-way reverse drive ratio in the rear unit 36'. One-way drives transmit power from the engine to drive the output and load, the vehicle wheels, but on vehicle overrun, coasting, do not transmit power from the output to the engine for engine braking. Two-way drives transmit power for drive from the engine input to the output and from the output, as during coasting, to the engine for engine braking.

For neutral, all of the clutches and brakes are released and no power from power input 16 and torque converter output shaft 28 is transmitted by either the front or rear unit planetary gearing to output shafts 81, 81'.

Drive range provides automatic shifting operation between three forward drive ratios, first one-way drive, second one-way drive and direct or third two-way drive in the front unit, while the rear unit is always in positive neutral. Drive range first one-way drive is obtained by engaging forward drive clutch 44 to deliver power from input shaft 34 through shaft 46 to drive ring gear 47 forwardly. Due to the load of the vehicle on planet carrier 74, the carrier tends to remain stationary so that sun gears 71, 72 are driven reversely. Power input to planet gear 75 from sun gear 72 tends to cause reverse rotation of planet carrier 77 but such rotation is prevented by one-way brake 82. Planet gear 75 therefore drives ring gear 76 forwardly in first one-way drive at the compound reduction of both planetary gearing units. The one-way brake 82 permits the transmission to freewheel on overrun when operating in drive range first one-way drive.

Drive range, second gear one-way drive is accomplished by retaining forward drive clutch 44 engaged and by applying disc brake 65 to render one-way brake 63, in series with brake 65, effective to prevent reverse rotation of clutch drum 52 and sun gears 71, 72. For second two-way drive in intermediate range second gear overrun brake band 60 is also applied for second two-way drive to provide overrun braking. In second gear one-way and two-way drive, power is applied to ring gear 47, sun gears 71 and 72 are held against rotation, and carrier 74 and output 81 are driven forwardly at the reduction ratio of the gear unit 47, 73, 71. First ratio one-way brake 82 on carrier 77 releases to permit carrier 77 to spin freely.

Drive range third or direct two-way drive, is accomplished by maintaining forward clutch 44 engaged, maintaining brake 65 engaged, releasing second gear overrun band 60, and applying direct drive clutch 48.

One-way brake 63 in series with brake 65 permits forward rotation of clutch drum 52 and drive of sun gears 71, 72 and thus is ineffective but ready for a shift to second drive. Since both ring gear 47 and sun gear 71 are driven at the same speed, the gear unit 47-73-71 is locked up and drives carrier 74 in direct drive. Since carrier 74 and sun gear 72 are driven at the same speed, the gear unit 72-75-76 is locked up and first one-way brake 82 overruns.

Intermediate range basically provides two-way second drive by additionally engaging brake band 60, as pointed out above. Upshifts to direct drive are not possible. Downshifts to first one-way drive occur at low speeds, where engine braking is not effective for a vehicle starting drive.

The rear transmission unit remains in positive neutral in all drives of the front unit in intermediate range and drive range.

In low range operation, in the front unit 36, only two forward drive ratios are available, namely, first gear two-way drive and at high coasting speeds and possibly also at very high driving speeds second gear two-way drive. Low range two-way first and second drives are used for overrun or downhill braking and two-way first drive is used for four wheel drive. Accordingly, downhill braking in low range operation is provided both in first gear and second gear two-way drives in the front unit. For low range, first two-way drive, clutch 44 and first reverse band 79 are engaged. Drive through the transmission is the same as drive range, first one-way gear. However, band 79 prevents rotation of carrier 77 on overrun for engine braking and two-way drive. Low range second speed two-way drive is the same as drive range second speed one-way drive wherein clutch 44 and brake 65 are engaged and overrun band 60 is also engaged.

In low range the front transmission unit preferably will not upshift from first to second when the engine is driving the vehicle as the engine cannot drive the vehicle under load at a sufficiently high speed to cause an upshift. This upshift only occurs during downhill coasting. This upshift can be made to occur at very high or maximum driving speeds.

In low range the first one-way drive is established in the rear unit by engaging forward clutch 44' making one-way brake 82' effective to provide one-way first drive in the rear unit, so that complete transmission provides four wheel drive, two-way to the front wheels and one-way to the rear wheels, without any shifting at normal speeds encountered in four wheel drive operation for vehicle drive operation. At higher speeds during drive or overrun operation, there is an upshift to two-way second drive in the front transmission and neutral in the rear transmission. In the arrangement where a low range upshift from first to second does not occur in response to speed four wheel drive continues until a manual shift to a higher range.

For reverse drive, in both the front and rear units 36 and 36' respectively, the forward drive clutches 44 and 44' are released, clutches 48 and 48' are engaged and reverse brake bands 79 and 79' are engaged and in the front unit band 60 and brake 65 are released. Drive is respectively through clutches 48 and 48' to drums 52 and 52', through sleeve shafts 70 and 70' to sun gears 71–72 and 71'–72'. Since forward drive clutches 44 and 44' are released, the gear units 71, 73, 51 and 71', 73' and 51' have no reaction point and ring gears 47, 47' freely spin. Carriers 77, 77' are held by brake bands 79, 79' and planet gear 75, 75' drive ring gears 76, 76' and output shafts 81, 81' in reverse. Thus there is a two-way reverse drive in both front and rear transmission units for reverse four wheel drive.

The above described one-way drives (OW) and two-way drives (2W) are effected by operation of the clutches, brakes and one-way drive devices by the control system as summarized in the following chart I for the front or main transmission and chart II for the rear or auxiliary transmission under low range pressure control, X indicating fluid engagement of fluid clutches or brakes and reaction operation effect of the one-way devices and O indicating release or overrun. In the first column of CHART I, "Drive", "Int.", "Low", and "Rev." indicate the range position of the manual valve 150 and under each range position, a line in all columns indicating the ratio drives and how effected in the front transmission. CHART II, CHART III, and CHART IV have corresponding lines indicating the corresponding ratio drive or neutral and how it is effected in the rear transmission.

CHART I

Front or Main Transmission Unit

| Range and Speed | 3rd FWD C1 44 | REV C1 48 | 2nd Plate Brake 65 | 2nd O.W. Brake 63 | 2nd Brake Band 60 | 1st O.W. Brake 82 | 1st REV Brake Band 79 |
|---|---|---|---|---|---|---|---|
| Drive |  |  |  |  |  |  |  |
| 1-OW | X | O | O | O | O | X | O |
| 2-OW | X | O | X | X | O | O | O |
| 3-2W | X | X | X | O | O | O | O |
| Int. |  |  |  |  |  |  |  |
| 1-OW | X | O | O | O | O | X | X |
| 2-2W | X | O | X | X | X | O | O |
| Low |  |  |  |  |  |  |  |
| 1-2W | X | O | O | O | O | X | X |
| 2-2W | X | O | X | X | X | O | O |
| Rev. | O | X | O | O | O | O | X |

CHART II

Rear or Auxiliary Transmission Unit
Low Range Pressure Control

| Range and Speed | FWD C1 44' | REV C1 48' | 1st O.W. Brake 82' | REV Brake Band 79' |
|---|---|---|---|---|
| Drive |  |  |  |  |
| N | O | O | O | O |
| N | O | O | O | O |
| N | O | O | O | O |
| Int. |  |  |  |  |
| N | O | O | O | O |
| N | O | O | O | O |
| Low |  |  |  |  |
| 1-OW | X | O | X | O |
| N | X | O | O | O |
| Rev. | O | X | O | X |

SYSTEM MODIFICATIONS

The modification shown in FIG. 3 has the same drive train and control system as shown in FIG. 2 except for the modified control system connection to the rear transmission 36' of the drive train so only these modified portions are shown in FIG. 3 and like reference numerals are applied to the rear transmission 36' and like primed reference numerals are applied to the modified portion of the control system. The FIG. 3 control system is same as the FIG. 2 control system except that the low range passage 124 of FIG. 2 is disconnected from the chamber 43' for engaging the forward clutch 44' and instead the drive range passage 121 has a branch 121' connected to chamber 43' of forward clutch 44'.

The forward clutch 44' is engaged in all ranges and the first one-way brake 82' is effective in first speed power drive of the rear transmission to provide a first speed one-way drive so there is a four wheel drive with a one-way drive in both transmissions in intermediate and drive range and the same four wheel drive in low range, two-way in the front transmission and one-way in the rear transmission. When the vehicle speed increases to automatically provide second speed drive in drive and intermediate ranges the one-way brake 82' overruns to automatically change to two wheel drive. Low range may or may not have such upshift as indicated above. Normal automatic shifting between second and third drive range occurs with drive only through the front transmission to the front wheels. Chart I shows the operation of the front transmission and chart III similarly summarizes the operation of the rear transmission under drive range pressure control for this modification.

CHART III

Rear Transmission Unit
Drive Range Pressure Control

| Range and Speed | FWD C1 44' | REV C1 48' | 1st O.W. Brake 82' | REV Brake Band 79' |
|---|---|---|---|---|
| 1-OW | X | O | X | O |
| N | X | O | O | O |
| N | X | O | O | O |
| 1-OW | X | O | X | O |
| N | X | O | O | O |
| 1-OW | X | O | X | O |
| N | X | O | O | O |
| Rev. | O | X | O | X |

The further modification shown in FIG. 4 also has the same drive train and control system as shown in FIG. 2 except that instead of low range passage 124 being connected to the chamber 43' of the forward clutch 44' of rear transmission 36', the intermediate range passage 136' is connected to engage forward clutch 44' of the rear transmission in both low and intermediate ranges. This arrangement will provide the same four wheel drive for starting in first speed as in the above modification for low range and intermediate range and two wheel drive in drive range. In low range first speed is a four wheel drive, two-way in the front transmission and one-way in the rear transmission, with manual range upshift or high speed automatic upshift to second speed drive automatically changing to two wheel drive by the front transmission. In intermediate range, first speed drive is a four wheel drive, one-way in both transmissions, and with a normal speed and torque demand upshift to second speed there is only a two wheel second speed drive by the front transmission. When the front transmission upshifts to second, first speed one-way device 82' in the rear transmission overruns so the rear transmission does not drive or is in neutral. In these modifications, reverse four wheel drive is the same as in the first embodiment. Relative to this further modification, Chart I applies to the front transmission and Chart IV to the rear transmission.

CHART IV

Rear or Auxiliary Transmission Unit
Intermediate Range Pressure Control

| Range and Speed | FWD Cl 44' | REV Cl 48' | 1st O.W. Brake 82' | REV Brake Band 79' |
|---|---|---|---|---|
| N | O | O | O | O |
| N | O | O | O | O |
| N | O | O | O | O |
| 1-OW | X | O | X | O |
| N | X | O | O | O |
| 1-OW | X | O | X | O |
| N | X | O | O | O |
| Rev | O | X | O | X |

CONTROL SYSTEM REGULATED MAIN SUPPLY

The brakes and clutches are operated in the sequence shown in Charts I and II by the hydraulic control system shown in FIGS. 2a and 2b. The fluid pressure source for the control system is an engine driven pump 19 shown in the gear schematic portion driven by input cover 16 and sleeve shaft 27 and shown in hydraulic schematic portion. Exhaust and lubrication oil drains to sumps 85 and 85'. Oil in the rear transmission sump 85' flows by gravity through passage 85a to front transmission sump 85. Oil is drawn from front sump 85 through a suction passage 86 connected to the pump and to a port 87 of a line pressure regulator valve 90. The pump delivers oil under pressure through passage 88 to port 89 of the pressure regulator valve 90 and main line 120. Pressure regulator valve 90 includes a movable valve member 91 having three spaced lands a, b and c of equal diameter slidable in valve bore 92 and a stem 95 formed thereon. A closure or plug 96 blocks off one end of the valve bore 92 to form a closed chamber 97 at one end of the valve bore. Chamber 97 is supplied with fluid through passage 98 in valve member 91. Valve member 91 is biased toward chamber 97 by a spring 100 seated on the fixed port sleeve 99. A control plug 101 having spaced large land a and small land b is slidable in the stepped bore 102 of sleeve 99, contacts stem 95 and acts in assistance to spring 100. Fluid under pressure is admitted to the space between lands a and b to act on the unbalanced area of land a when operating in reverse to boost the line pressure, by means of reverse range passage 125 and a port 104 of sleeve 99. Fluid pressure is also admitted by port 106 in end wall 107 to a chamber 105 in the sleeve beneath land b to act on boost plug 101 to assist the spring 100. The shuttle valve 116 supplies the higher pressure provided by the modulator pressure passage 123 or intermediate pressure passsage 136 to modulator or intermediate passage 117 and port 106.

The modulator pressure delivered to chamber 105 in drive range variable throttle operation varies as a function of intake manifold pressure and vehicle speed and decreases as vehicle speed increases and increases with increase in torque demand between, e.g., 0 and 150 psi and varies main line pressure in a reduced degree in the same way between, e.g., 60 and 150 psi. In drive range detent operation, modulator pressure in passages 123 and 117 is not less than detent pressure in passage 128, e.g., 70 psi, regulated by detent regulator valve 260, and acts in chamber 105 to provide a higher main line pressure range, e.g., 70 to 150 psi. In intermediate range and low range the intermediate range passage 136 and the modulator or intermediate passage 117 provide main line pressure in chamber 105 to provide main line pressure at a constant higher value, e.g., 150 psi. In reverse range modulator pressure acts as in drive range and reverse pressure at the main line pressure value in reverse passage 125 acts on the unbalanced area of land 101a, to provide maximum variable main line pressure, e.g., 160 to 250 psi.

Main line 120 pressure is connected by port 89 and passage 98 to chamber 97 and, when above the proper regulated value will force the valve member 91 to move against bias spring 100 and the bias boost force to cause land c to open a port 108 and connect excess fluid or first overage to a converter feed supply passage 110 to supply the torque converter. If excess pressure still exists in chamber 97, suction port 87 will also be opened by land b to permit second overage fluid flow from main line port 89 to suction port 87 of suction passage 86.

Fluid under pressure, lower than line pressure, is supplied to the torque converter to passage 110 and returned from the converter through a passage 111. Passage 111 is connected through an oil cooler 112 which may have a high pressure bypass to a transmission lubrication supply passage 113 to both transmission units and may have a lubrication pressure blowoff valve (not shown) to limit lubrication pressure in passage 113 upstream of the lubrication system restriction.

MANUAL VALVE

A main line pressure supply passage 120 extends from port 89 of the line pressure regulator valve 90 to a manually operable drive range selector valve designated generally at 150 in FIG. 2b which has a valve element 151 having lands a, b and c slidable within a bore 152 in the valve body 153 and a pair of spaced flanges 155 to receive an actuating pin which is moved by linkage, not shown, operable by the vehicle driver to position the element 151 of valve 150 for Park P, Reverse Range R, Neutral N. Drive Range DR, Intermediate Range INT or Low Range LO conditions of operation.

The main line 120 is connected by port 163 centrally in the valve body 153 which is blocked by land 151a in the Park position, connected to the bore 152 between lands 151b and c in the Reverse and Neutral positions and further connected from the space between lands 151b and c to the space between lands 151a and b by long drive port 164 in drive and intermediate range positions and by long intermediate port 165 in low range position. This arrangement of a normal axial length main line inlet port and axially longer feed ports with the drive, intermediate and low ports consecutively overlapping and increasing the axial length of the space feed by main line from between lands b and c to between lands a and c provides with a shorter length valve the selective feed in each valve position to the range ports and passages indicated by X and exhaust indicated by Ex. 160 and Ex. 167 at opposite ends of the bore.

| RANGE | LOW | INT | DR | REV NDR | REV |
|---|---|---|---|---|---|
| Passages | 124 | 136 | 121 | 137 | 125 |
| Ports | 166 | 165 | 164 | 162 | 161 |
| RANGES | | | | | |
| LO | X | X | X | Ex160 | Ex160 |

| RANGE | LOW | INT | DR | REV NDR | REV |
|---|---|---|---|---|---|
| INT | Ex167 | X | X | Ex160 | Ex160 |
| DR | Ex167 | Ex167 | X | X | Ex160 |
| N | Ex167 | Ex167 | Ex167 | X | Ex160 |
| R | Ex167 | Ex167 | Ex167 | X | X |

Reverse Neutral Drive Range or Servo passage 137 is connected only to release chamber 341 of second servo 310. Drive range passage 121 is connected to governor 200, apply chamber 43 of forward and reverse clutch 48, 1–2 shift valve 205, detent regulator valve 260 and 1–2 accumulator valve 285. Intermediate range passage 136 is connected by shuttle valve 116 to main regulator valve 90 and 2–3 shift valve 230. Low range passage 124 is connected to 1–2 shift valve 205, detent regulator valve 260, 1–2 accumulator valve 285 and by shuttle valve 355 and low and reverse range passage 126 to apply chamber 327 of Low and Reverse servo 320. Reverse range passage 125 is connected to reverse chamber 56 of third reverse clutch 48, main regulator valve 90, shuttle valve 355 and low and reverse range passage 126 to apply chamber 327 of Low and Reverse servo 320 and 2–3 shift valve 230.

VACUUM MODULATOR VALVE

Main line 120 supplies the modulator valve 170 which has a valve element 174 slidable in bore 175 in valve body 176. The valve element 174 is biased by a vacuum modulator 177 having a housing 178 and divided by a flexible diaphragm 179 into an atmospheric chamber 180, vented by air vent 181 or air vent 195 and located on the valve side of the diaphragm and a vacuum chamber 182 connected by vacuum passage 183 to an engine intake manifold (not shown). A spring 187 in vacuum chamber 180 is seated on seat 188 of housing 178 and biases the diaphragm against the opposing vacuum bias to transmit a vacuum modulator or torque demand force directly proportional to torque demand through the diaphragm 179 and strut 189 to valve element 174 in a pressure increasing direction.

The valve element 174 has large diameter land $a$, intermediate diameter land $b$ and small equal diameter lands $c$, $d$ and $e$ slidable in stepped bore 175. Exhaust port 195 vents the bore to atmosphere between the vacuum modulator and valve. Line pressure is admitted to port 190 from passage 120. Governor pressure which increases with vehicle speed is admitted to port 194 from governor pressure delivery passage 122. Land $a$ is a non seal guide land. Land $b$ has a larger diameter than land $c$ so governor pressure between them exerts a force on the movable modulator valve tending to move the valve to the left as viewed in the drawing against the torque demand vacuum modulator force to position land $d$ to block off modulator port 191 from port 190. Port 191 connects to a modulator pressure delivery passage 123 having a branch 196, restricted for damping, to act on the end of land $e$ through port 193. Detent port 192 connects to a detent passage 128 which normally is connected to exhaust and acts as an exhaust passage for excess pressure from passage 123 and enables the modulator valve to regulate pressure in modulator passage 123. Thus, the modulated pressure in passage 123 normally decreases with increase in vehicle speed, decreases with decrease in torque demand, and increases with increase in torque demand. During normal zero to full throttle non detent operation the detent passage 128 provides free or zero pressure exhaust so modulator pressure varies between a minimum and a maximum, e.g., 0 to 150 psi. During full throttle detent operation the detent passage 128 has detent pressure at an intermediate value, e.g., 70 psi, so modulator pressure cannot be less than the intermediate value, e.g., 70 psi, and varies between a minimum, e.g., 70 psi, up to the same maximum, e.g., 150 psi, in the same way as non detent operation modulator pressure. Modulator passage 123 is connected by small restriction 197 to main line 120 and by small restriction 198 to detent passage 128 to improve regulation. Modulator pressure in passage 123 is directed by shuttle valve 116, in the absence of intermediate pressure, to detent or intermediate passage 117, port 106 and control plug 101 to increase line pressure with increase of modulator pressure in passage 123. Modulator pressure passage 123 is also connected to 1–2 accumulator valve 285 and detent valve 250 for connection to modulator I passage 130 to 3–2 valve 275 for purposes explained below.

GOVERNOR

A governor 200 driven by front transmission output shaft 81 may be as shown in the patent to M. S. Rosenberger, U.S. Pat. No. 2,762,384 issued Sept. 11, 1956. Governor 200 receives line pressure from drive range passage 121 and delivers governor pressure increasing with increasing front transmission output speed to governor pressure passage 122. The governor passage 122, is connected to 1–2 shift valve 205, to 2–3 shift valve 230 and to port 194 of modulator valve 170 and supplies governor pressure in drive, intermediate and low range operation.

FIRST TO SECOND SHIFT VALVE

The first to second shift valve or 1–2 shift valve 205 includes a shift valve element 206 having spaced lands $a$, $b$ and $c$ of increasing diameter in a stepped bore 207. Land $b$ is of greater diameter than land $a$ to provide a thrust on the valve tending to maintain the valve in its upshift position once the valve has moved to such position. A third land $c$ of greater diameter than land $b$ is responsive to pressure from low range passage 124 and tends to bias valve element 206 towards its upshift position when manual valve 150 is in low range position. Port 209 connects to governor pressure passage 122 and admits governor pressure to the end of bore 207 to act on the end of land $a$ tending to bias the valve from its downshift to its upshift position. Port 210 connects to exhuast. Port 211 connects to a second to third drive pressure passage 127. Port 212 connects to drive range passage 121. Port 213 connects to low range passage 124. An exhaust 214 vents the bore between shift valve element 206 and detent valve element 215.

A 1–2 detent valve element 215 having lands $d$, $e$ and $f$ and a regulator valve element 216 having lands $g$ and $h$ are in axial alignment with 1–2 shift valve element 206. The largest diameter land $d$ is adjacent the shift valve element and lands $e$ and $f$ of the detent valve element and lands $g$ and $h$ of the regulator valve element have consecutively reduced diameters and fit in consecutively smaller stepped portions of bore 207. This bore portion has beginning at land 215$d$ consecutively substantially evenly spaced ports 217, 218, 219, 220, 221, 222, 223, 224 and end chamber port 225. Ports 217, 219 and end chamber port 225 are interconnected by long transfer passage 226. Ports 220 and 221 are connected by short transfer passage 227. Ports 222 and 224 are connected by regulator transfer passage 228. Port 218 is connected to modulator II passage 129. Port 223 is connected to detent passage 128. A spring 229 is positioned in a counterbore in detent valve element 215 to bias these two valve elements 215 and 216 apart and to bias the detent valve element 215 into contact with and provide a downshift bias on the shift valve element 206.

In downshift position shown, 1–2 shift valve element 206 connects intermediate clutch or 2–3 drive passage 127 between lands 206a and b to exhaust 210 and land 206b blocks drive range passage 121. In upshift positon drive range passage 121 is connected between lands 206a and b to 2–3 drive passage 127 and land 206a blocks exhaust 210. Land b is slightly larger than land a, providing on upshift main line pressure hysteresis.

The 1–2 shift valve assembly 205 has governor pressure when supplied by passage 122 and port 209 acting in all valve positions on the end area of land 206a providing an upshift force. Main line pressure supplied by drive pasage 121 and port 212 acts only in upshift position on the unbalanced area of lands 206a and b so main line pressure provides a small upshift hysteresis force. During normal throttle operation in first ratio with the 1–2 shift valve downshifted, modulator pressure when supplied by shift modulator II passage 129 and port 218 acts on the unbalanced area of lands 215d and e providing a first modulator downshift force and flows through port 219, passage 226 and port 225 to the closed end of the bore to act on regulating valve land 216g against spring 229 to feed regulated reduced modulator pressure via port 224, passage 228, port 222 to the bore between detent valve element 216 and regulator valve element 215 to oppositely act on regulator valve land 216g for pressure regulation by exhaust to exhausted detent port 223 and passage 128 and to act in a downshift direction on detent valve land 215e with a second modulator downshift force so upshifts occur at speeds increasing with increasing modulator pressure. On an upshift land 215d blocks modulator pressure supply port 218 so there is no modulator downshift bias and a downshift by spring 229 overcoming the governor bias occurs at a lower speed. On the upshift the bore portions previously supplied with modulator pressure fluid are exhausted. The space between the detent and regulator valve elements is connected by regulator transfer passage 228 to the exhausted detent passage 128. The bore between lands 215e and f is connected by short transfer passage 227, the bore between lands 215d and e, long transfer passage 226, port 217, the bore 207 between the detent and shift valve elements to exhaust 214 to exhaust both bore portions. The chamber at the end of bore 207 is exhausted by port 225 to exhausted long transfer passage 226.

In detent operation, with the 1–2 shift valve assembly 205 in the upshifted position, detent pressure supplied by modulator II passage 129 is blocked at port 218 by detent valve land 215d and detent pressure supplied by detent passage 128 through port 223 and regulator transfer passage 228 enters the bore 207 between valve elements 215 and 216, disables regulator valve element 216 and acts on land 215f to provide a detent downshift force on the shift valve so a detent downshift is at a higher speed than a normal downshift. After a detent downshift or detent operation with the 1–2 shift valve downshifted, detent pressure is supplied by modulator II passage 129 as in normal throttle operation above and also fed by detent passage 128 to continue to disable reducing pressure regulator valve element 216 so detent pressure acts on the unbalanced area of lands 215d and e and land 215e, or the full area of land d, so a detent upshift occurs at a higher speed than in normal throttle operation and than a detent downshift. The detent upshift occurs at a higher speed than the detent downshift, detent hysteresis, due to detent pressure acting on a larger area and due to main line hysteresis.

In low range operation, main line pressure supplied by low range passage 124 and port 213 acts in the upshift and downshift valve positions in an upshift direction on the small unbalanced area of lands 206b and c to provide a small speed reducing correction during both upshifts and downshifts since main line pressure replaces all modulator pressures and detent pressure. Main line pressure is supplied to both modulator II 129 passage and detent passage 128 so main line pressure, like detent pressure, acts in downshift position on the full area of land d, by acting on lands d and e, of 1–2 detent valve element 215 to oppose an upshift and acts in upshift position on the full smaller area of land f for a downshift for low range shifting at higher than detent shift speeds with hysteresis low range pressure hysteresis and main line hysteresis.

SECOND TO THIRD SHIFT VALVE

A second to third speed shift valve or 2–3 shift valve assembly 230 has a shift valve element 231 having small diameter land a and large diameter land b in stepped bore 232. Port 233 admits governor pressure from governor pressure delivery passage 122 to the chamber 234 in the closed end of bore 232 to act on the end of land 231a. Port 235 connects to reverse range passage 125. Port 236 connects to a direct drive clutch passage 132 leading to the chamber 55 of the direct drive and reverse clutch 48 to apply the clutch. Port 237 connects to second to third drive passage 127 which is supplied with fluid when the 1–2 shift valve 205 is in its upshift or second gear drive position. Port 238 connects to intermediate range passage 136. A second to third, or 2–3 modulator valve element 242 has lands c, d, e and f of consecutively decreasing diameters in a stepped bore 244 having a portion cooperating with each land. A spring 245 is located between and exerts a separating bias on the 2–3 shift valve element 231 and 2–3 modulator valve element 242. A spring 246 is in the end of bore 244 exhausted by exhaust 249 and seated on the valve housing biases modulator valve element 242 and shift valve element 231 towards their downshift position. Port 247 connects to detent pressure passage 128. Port 248 connects to shift modulator II passage 129.

In the downshift position shown, 2–3 shift valve element 231 connects direct clutch passage 132 between lands 231a and b to reverse range passage 125 which is exhausted except in reverse range and intemediate clutch or 2–3 drive passage 127 is blocked by land 231b. In upshift position, 2–3 shift valve element 231 connects 2–3 drive passage 127 between the lands to direct clutch passage 132 and land 231a blocks reverse range passage 125.

Governor pressure is supplied by passage 122 and port 233 to the end of bore 232 to act on the end of land 231a in an upshift direction in low, intermediate and drive ranges in both valve positions. In intermediate and low ranges main line pressure supplied by intermediate range line 136 and port 238 to the bore between valve elements 231 and 242 holds shift valve element 231 in downshift position at any speed. In drive range during normal throttle operation, when 2–3 shift valve element 231 and modulator valve element 242 are in the downshift position, modulator pressure is supplied by modulator II passage 129 and port 248 to act on the unbalanced area of land 242d less the area of land f, as land e is out of its step of bore 244, to provide a large modulator downshift bias assisting the spring 246. In the upshift position of these valve elements land 242e enters its step of bore 244, so modulator pressure acts on the reduced unbalanced area of lands 242e and f to provide a reduced modulator pressure force so downshfts are at a lower speed due to this modulator pressure hysteresis effect. In detent operation, modulator pressure, now maximum and equal to detent pressure, functions as explained above in normal throttle operation to provide a bias opposing the governor bias and detent pressure, supplied by detent passage 128 acts on the other lands to provide a detent pressure bias opposing the governor bias, which acts on the area of land 242c less the area of land 242f and is the same in downshift and upshift positions. This provides detent upshift at higher speeds than normal upshift speeds, and downshifts at lower speeds than detent upshift due to main line hysteresis but higher than normal downshift speeds.

DETENT VALVE

A detent valve 250 has a valve element 251 having equal diameter lands a and b in bore 252 with four ports 253, 256, 257 and 258. Main line passage 120 is connected through restriction 305 to branch passage 120a and port 253 to supply pressure under the control of detent solenoid valve 306 to move detent valve element 251 from normal position to detent position shown during detent operation. Port 256 connects to modulator pressure passage 123. Port 257 connects to a shift modulator pressure I passage 130 leading to a port 283 of a modulator pressure cutoff or 3–2 valve 275. Port 258 connects to detent passage 128.

A detent regulator valve indicated generally at 260 has a valve element 261 having four spaced equal diameter lands c, d, e and f in bore 262. Land 261d is a guide land having a passage or notch through it. A spring guide and valve stop pin 265 is disposed in the valve bore at one end of the valve. A spring 266 seated on the closed end of the bore biases the detent regulator valve toward its right-hand position. Five ports 258, 267, 268, 269 and 270 are associated with regulator valve 260. Ports 258 and 268 connect to detent passage 128. Port 267 connects to drive range passage 121. Ports 269 and 270 connect to low range passage 124.

During variable throttle operation in drive and intermediate range, deenergized detent solenoid valve 306 is closed so main line pressure supplied by passage 120a and port 253 acts on land 251a to move detent valve element 251 to the open position shown connecting modulator pressure passage 123 to shift modulator I passage 130 connected to the 3–2 valve 275 and which in turn acts on regulator valve element 261 to hold it with stop pin 265 limiting movement in the non-regulating or exhaust position connecting detent passage 128 by ports 268 and 270 to low range passage 124 exhausted, except in low range, at the manual valve 150. Drive line pressure supplied by passage 121 and port 267 is blocked between equal diameter lands 261c and e, land d being notched and narrower than port 267.

In detent position of the throttle in drive and intermediate range, energized detent solenoid valve 306 exhausts passage 120a permitting spring 266 to move valve element 261 to regulating position connnecting main pressure drive range passage 121 by port 267 to the space between lands 261c and e for feed by port 258 through dampening restricted notched guide land 261d, to detent port 258 and passage 128, port 257 and modulator I passage 130, and the bore between the regulator and detent valve elements 261 and 251. Detent pressure acts on the area of land 261e when land 261c is in the larger bore 252 to provide detent pressure bias on the regulator valve element 261 against spring 266 tending to cause land c to block the connection from drive passage port 267 to detent pressure port 268 and to connect detent pressure port 268 to port 270 to the exhausted low range line 124. Detent pressure is regulated at a mean or intermediate value, e.g. 70 psi relative to maximum full throttle modulator pressure, e.g., 150 psi. Detent pressure in the bore between valve elements 261 and 251 acts on the end of land 251a to move detent valve element 251 to the closed position blocking modulator passage 123 connection to port 257 by blocking the bore between port 256 and port 257.

In low range, the low range pressure supplied by passage 124 to ports 269 and 270 acts on land 261f to move valve element 261 to feed position connecting drive range line 121 by ports 267, 258 and 257 to supply main pressure, e.g., 150 psi, to both detent passage 128 and shift modulator I passage 130.

MODULATOR PRESSURE CUTOFF VALVE

A modulator pressure cutoff valve 275 which may be termed a third to second valve has a movable valve element 276 having equal diameter lands a and b in bore 277 having four ports 280, 281, 282 and 283. Port 280 connects to direct drive clutch passage 132. Passage 132 receives line pressure from the second to third shift valve 230 when the shift valve is in its upshift or third speed position and is connected to exhaust by the second to third shift valve when the shift valve is in its downshift position. Port 281 is connected to detent passage 128. Port 282 connects to shift modulator pressure II passage 129. Port 283 connects to shift modulator pressure I passage 130. In intermediate and drive range, normal operation detent passage 128 is connected to exhaust. In intermediate and drive range detent operation, detent pressure regulator valve 260 supplies detent pressure to detent passage 128 and modulator I passage 130. In manual low range operation, detent pressure regulator valve 260 supplies full line pressure to detent passage 128 and modulator I passage 130.

In low, intermediate and drive range operation in first and second gear drive, direct or third clutch passage 132 is connected to exhaust by the second to third shift valve 230, through ports 236, 235 and reverse passage 125. A spring 279 guided by a valve stop pin will bias valve element 276 to its modulator feed position shown to admit modulator pressure from shift modulator I passage 130 to shift modulator II passage 129 so that the modulator pressure is effective upon the first to second and second to third shift valves 205, 230 tending to downshift the shift valves. Detent passage 128 is blocked.

On a shift from second to third gear, 2-3 shift valve 230 will direct line pressure to third clutch passage 132 and this pressure acting on land 276a of 3-2 valve element 276 will tend to move valve element 276 to non-modulating position to block off passage 130 and connect modulator II passage 129 to exhaust through ports 282, 281 and detent passage 128. At the same time, spring 279 and modulator I pressure from passage 130 act to bias the valve element 276 toward a position wherein the valve element 276 is effective to connect modulator I passage 130 to modulator II passage 129 and block off detent passage 128. Thus, in drive range, third gear drive, at light to intermediate throttle, light to intermediate torque demand condition, the modulator pressure which is relatively low plus force of spring 279 will not be sufficient to overcome the effect of line pressure from passage 132 acting on land 276a and the valve element 276 will move against spring 279 to non-modulating position to connect modulator II passage 129 to exhaust. At high throttle, high torque demand, modulator pressure in modulator I passage 130 will be relatively high, higher than detent pressure, so that this pressure plus the force of spring 279 will be effective to move 3-2 valve element 276 to modulator feed position to connect modulator I passage 130 to modulator II passage 129. This is to permit a heavy throttle forced downshift from third to second prior to detent operation and to prevent hunting of the second to third shift valve 230 after a light throttle upshift from second to third.

Since detent pressure does not move 3-2 valve 275 against the third clutch pressure (132) bias, during detent operation 3-2 valve 275 is in the non-modulator feed position in third and in the modulator feed position in first and second in all forward ranges. For detent operation, detent pressure is delivered to modulator II passage 129 irrespective of the position of 3-2 valve 275 since both detent passage 128 and modulator I passage 130 have detent pressure. Though third clutch pressure (132) in reverse range moves the 3-2 valve 275 to non-modulator feed position, this has no effect as there is no governor pressure and no shift valve operation.

FIRST TO SECOND ACCUMULATOR CONTROL VALVE

An accumulator regulating and control valve 285 includes an accumulator control valve element 286 having small equal diameter lands a and b and larger diameter land c and accumulator regulator valve element 287 having lands a, b and c of consecutively increasing diameter both elements located in bore 288 stepped to fit the lands and closed at both ends. Heavy force spring 289 in modulator pressure chamber 290 in the end of the bore is in a guide bore in and acts on regulator valve element 287 to bias both valve elements to increase accumulator pressure and to the limit position shown where the stop and spring guide portion 291 of control valve element 286 engages the end of bore 288 as shown. A light force spring 292 in accumulator pressure chamber 293 acts on and biases control valve element 286 and at times both valve elements in the opposite direction to reduce accumulator pressure. Ports 294 and 295 connect accumulator control valve pressure delivery passage 134 respectively to accumulator pressure chamber 293 and bore 288. Port 296 connects to a low range pressure passage 124. Port 297 connects to drive range pressure supply passage 121. Port 298 connects to detent pressure delivery passage 128. Exhaust port 299 exhausts the space between lands a and b of regulator valve element 287 so modulator pressure in chamber 290 and detent pressure between lands b and c will not affect each other. Port 301 connects modulator pressure passage 123 to chamber 290 which is also connected by restriction 302 to the bore between the valve elements.

The manual valve 150, positioned for intermediate and drive range operation, supplies line pressure through drive range passage 121 to port 297 and connects port 296 by low range passage 124 to exhaust 167. In normal drive range operation, detent passage 128 is connected to exhaust through ports 268, 270 of detent regulator valve 260 and low range passage 124. Main line pressure from drive range passage 121 and port 297 is fed to increase accumulator pressure as shown between balanced lands 286a and b to accumulator port 295 and passage 134 which is also connected to port 294 and chamber 293 to act on the full end area of land 286c to oppose the net bias force of heavy force spring 289 as reduced by the light force spring 292 to regulate accumulator pressure in passage 134 at an intermediate value. Accumulator pressure from passage 134 and port 295 is exhausted when land 286b moves to the other side of port 295 to close the above feed connection and to connect accumulator pressure port 295 to low range pressure port 296 and exhausted low range passage 124. Modulator pressure is supplied by modulator valve 170, passage 123 and port 301 to chamber 290 and then through restriction 302 to the bore between lands 286a and 287c to provide a net modulator pressure force bias, land 287a plus land 286a minus land 287c to increase accumulator pressure proportional to modulator pressure to a higher full throttle value. Accumulator pressure is higher than modulator pressure and less than main pressure and increases with increasing modulator pressure.

In drive and intermediate range detent operation, which occurs at an accelerator pedal position past full throttle under maximum horsepower conditions of operation, detent pressure in passage 128 acts on the unbalanced area of land 287c less 287b to boost the pressure delivered by accmulator valve 285 to passage 134. In normal variable throttle intermediate drive range operation, the accumulator pressure delivered by valve 285 to passage 134 is an intermediate pressure less than line pressure varying with and higher than modulator pressure. The accmulator pressure delivered to passage 134 in intermediate and drive range detent operation is higher than accumulator pressure during normal variable throttle operation and similarly varies with modulator pressure and is less than line pressure. In low range operation, low range passage 124 will be supplied with fluid from the drive range selector valve 150. The accumulator control valve 285 exhaust port 296 is thus supplies with main line pressure, so the valve cannot regulate and accumulator pressure is main line pressure. In reverse range operation, both drive and low range passages 121 and 124 are exhausted at the manual valve 150 so there is no accumulator pressure.

DETENT SOLENOID VALVE

The main line 120 is connected through restriction 305 to branch 120a to control detent valve 250. The normally closed detent solenoid valve 306, when not energized, provides main line pressure in branch 120a to move detent valve 250 to modulator feed position. When the accelerator pedal is moved through detent beyond full throttle position as shown for example in Winchell U.S. Pat. No. 3,321,056, patented May 23, 1967, detent solenoid valve 306 is energized and open to connect the branch 120a, downstream of restriction 305, to exhaust 307 so detent valve 250 is in the detent pressure regulating position.

FRONT UNIT SECOND RATIO SERVO

The second ratio servo 310 has an apply piston 311 and an accumulator piston 312 in slidable sealed contact with the internal cylindrical wall of cylinder housing 313. The apply rod 314 is slidably guided in a bore in one end wall of housing 313, has an external end conventionally connected to operate second brake band 60 and is biased in a release or retraction direction into the housing by a retraction spring 315 seated on the internal side of the one end wall of housing 313 and on abutment 316 secured to apply rod 314 to a released position shown in engagement with stop rod 317 fixed in the opposite end wall of housing 313. The apply piston 311 has a bore in slidable sealed contact with apply rod 314. The accumulator piston 312 is slidable on stop rod 317 between a discharged position shown with the accumulator piston engaging the opposite end wall of the housing and biased by accumulator spring 318 to a charged position engaging stop member 319 fixed at the end of stop rod 317. The reverse, neutral and drive or servo passage 137 is connected to supply main line pressure to release chamber 341 between the one end wall of housing 313 and apply piston 311 to prevent apply movement of apply piston 311 in reverse, neutral and drive positions of the manual valve 150 and position both pistons 311 and 312 in the fully retracted position shown except in drive range third ratio. In drive range second ratio, the second third drive passage 127 supplies main line pressure to apply chamber 342, but with servo pressure in release chamber 341, the pistons remain in the fully released position. The third or direct drive clutch passage 132 is connected to accumulator chamber 343 and on a shift to third speed in drive range supplies main line pressure to the discharged accumulator chamber 343 to balance the second third passage pressure in apply chamber 342 so the fluid pressure forces on accumulator piston 312 are balanced and accumulator spring 318 moves accumulator piston 312 to stop 319 to charge the accumulator reducing third clutch engagement flow in passage 127 to cushion engagement of third clutch 48. The accumulator piston 312 during this charging movement moves the apply piston 311 which is hydraulically balanced by main line pressure in release chamber 341 and apply chamber 342, freely from the fully retracted position to the minimum retracted position contacting spring abutment 316, but not moving apply rod 314 to apply brake band 60.

In low and intermediate range the release chamber 341 is exhausted by servo passage 137 at the manual valve 150. Two three drive passage 127 supplies main pressure to apply chamber 342 to move accumulator piston 312 against higher force accumulator spring 318 to the discharged position for cushioning and apply piston 311 moves freely from fully retracted position to minimum retracted position engaging spring abutment 316 and then against the bias of retraction spring 315 to move apply rod 314 to engage brake band 60 for two way second speed drive.

FRONT UNIT FIRST AND REVERSE BAND SERVO

A first and reverse band servo 320 is used to apply brake band 79 when the transmission is operated in low range forward first ratio two-way drive or reverse drive.

Servo 320 includes a housing 321 having a band apply piston 322 fixed to a band actuating stem 323 which is connected to actuate band 79 by conventional means, not shown. A light force spring 324 seated on the housing yieldably biases apply piston 322 to its band release position shown. Apply piston 322 has a base portion 325 abutting one end of the housing in the release position and a cylindrical portion 326 abutting the other end of the housing if normal apply movement is exceeded and sealed to the internal cylindrical surface of the housing to provide expansible apply chamber 327 connected to low or reverse passage 126. An L-shaped annular accumulator piston 328 is sealed to the internal surfaces of apply piston cylindrical portion 326 and coaxial cylindrical housing portion 329 to define accumulator chamber 331 having at one end the outer minor area portion of the apply piston 322 and the area of the accumulator piston and at the other end the housing. The accumulator piston is biased by both accumulator control pressure supplied by line 134 to accumulator chamber 331 and accumulator spring 332 to engage the apply piston base 325 to bias the apply piston toward release position. The 2–3 drive branch passage 127a is connected to expansible release and accumulator chamber 333 defined at one end by the apply piston base, a major portion of the apply piston area and at the other end by the accumulator piston 328 and the housing to move apply piston 322 in a release direction and accumulator piston 328 to increase the volume of release chamber 333.

REAR UNIT REVERSE SERVO

The rear unit reverse servo 336, FIG. 2b has the same structure as the front unit first and reverse servo 320 so like primed reference numerals have been used and reference is made to the above description of servo 320. Since the rear unit reverse servo 336 is only used in reverse drive to apply rear unit reverse band 79', the reverse drive passage 125 is connected to apply chamber 327' and accumulator chamber 331' and release chamber 333' are respectively exhausted by exhausts 337 and 338.

TIMING DEVICES

The control system has, FIG. 2q, several timing devices each constructed like timing device 349 having a ball check valve 351 opening in response to flow in one direction to permit high or full flow in that one direction and closing in response to flow in the opposite direction to prevent flow through the check valve so the fixed restriction 352 associated in parallel flow relation relative to the check valve restricts flow in the passage. Each timing device is located in a passage between a valve and an actuated device, a chamber of clutch or brake servos. The valve selectively supplies fluid pressure through the passage and timing device to an actuated device and exhausts fluid from an actuated device through the passage and timing device. The timing devices provide full flow in response to flow in one direction and restricted flow in response to flow in the opposite direction in the passage in which they are located.

Timing devices 345 and 347 respectively provide full flow feed and restricted exhaust in reverse or low passage 126 to apply chamber 327 of first and reverse servo 320 and in the direct or third clutch passage 132 to third chamber 55 of third and reverse clutch 48 and accumulator chamber 343 of second servo 310. Timing devices 346, 348, 349 and 350 provide restricted feed and full flow exhaust respectively (346) in the reverse drive passage branch 125a to reverse chamber 56 of third and reverse clutch 48, (348) in 2-3 drive passage branch 127a to chamber 68 of second brake 65 and release chamber 333 of low and reverse servo 320, (349) in 2-3 drive passage branch 127b to apply chamber 342 of second servo 310, (350) in servo passage 137 to release chamber 341 of second servo 310.

SHUTTLE VALVES

Shuttle valves 355 and 116, FIG. 2a, are ball valves and function to connect the pressurized one of a pair of passages to a third passage and to block the exhausted one of the pair of passages. Shuttle valves 355 and 116 respectively connect either low range passage 124 or reverse passage 125 to low or reverse passage 126 and either modulator passage 123 or intermediate range passage 136 to modulator or intermediate passage 117.

OPERATION, NEUTRAL

In neutral position of the manual valve 150 with the engine running at a normal throttle but not in detent, the control system provides regulated main line pressure in main line passage 120, converter feed pressure in passage 110, servo passage 137 and modulator pressure in passage 123. The converter feed pressure fills the torque converter 21 for drive to input shaft 34 of the front transmission or gear unit 36 and input shaft 34' of rear transmission or gear unit 361. Since all range lines, reverse 125, drive 121, intermediate 136 and low 124 are exhausted at the manual valve 150, fluid pressure is not supplied directly or through the shift valves as explained below for each drive range to engage any fluid actuated drive establishing devices, the fluid servos or piston and cylinder operated clutches and brakes, so both gear units 36 and 361 are in positive neutral. The manual valve 150 supplies the servo passage 137 through the restriction of timing device 350 to chamber 341 to deactivate second servo 310. The control and lubrication systems exhaust to both sumps 85—85' and rear sump 85' drains by gravity through passage 85a to front sump 85. The engine driven converter drive housing 16 drives pump 19 which pumps from sump 85 through suction passage 86 to delivery passage 88 and main regulator valve 90 which delivers main regulated pressure to main line 120, first overage to converter feed passage 110 and second overage to pump suction passage 86.

Since the drive range passage 121 is exhausted, there is no governor pressure in passage 122. The main pressure in passage 120a opens detent control valve 250 and detent regulator valve 260 to exhaust detent passage 128. Solenoid detent valve 306 could be, but is normally only operated to provide detent pressure in automatic shifting ranges described below. Main pressure, passage 120, is supplied to modulator valve 170 to supply modulator or torque demand pressure to passage 123 directly to 1-2 accumulator valve 285 and main line regulator valve 90 and at normal throttle through detent valve 250 to modulator I passage 130 and the 3-2 valve 275 to modulator II passage 129 to be available at 1-2 shift valve 205, 2-3 shift valve 230 on a shift to any range for drive.

LINE PRESSURE REGULATOR

In drive range modulator pressure from passage 123 is applied through shuttle valve 116 and passage 117 to boost chamber 105 of the line pressure regulator plug 101 of regulator valve 90 to vary line pressure as a function of torque demand and vehicle speed, e.g., between 70 and 150 psi. In intermediate and low ranges, line pressure is supplied by intermediate range passage 136, shuttle valve 116 and passage 117 to boost chamber 105 so line pressure delivered by the line pressure regulator valve 90 is a constant higher value, e.g., 150 psi. In manual low range, modulator pressure (123) becomes full line pressure so main line boost is the same as in intermediate range. In reverse, both reverse oil from passage 125 and modulator pressure from passage 123 act on the line pressure regulator valve which will regulate line pressure between higher values, e.g., 150 to 230 psi.

OPERATION DRIVE RANGE — VARIABLE THROTTLE

With manually operable drive range selector valve 150 positioned for drive range for three speed automatic shifting operation, line pressure from passage 120 is admitted to drive range passage 121 and remains connected to servo passage 137. Reverse range passage 125, intermediate range passage 136 and low range passage 124 are connected to exhaust.

Line pressure, as in neutral, is supplied, when detent solenoid valve 306 is not energized and closed, by passage 120 and 120a to port 253 and the end of land 251a of detent control valve 250 moving the valve against spring 266 to its non-detent open position. Line pressure from passage 120 is also supplied to port 190 of the vacuum modulator valve 170 providing modulator pressure in passage 123.

Drive range pressure passage 121 conducts line pressure to governor 200 so when the vehicle moves governor pressure is provided in passage 122, to port 297 of the first to second accumulator control valve 285 so accumulator pressure is provided in passage 134, to port 267 of detent regulator valve 260 so detent pressure can be provided in passages 128 and 130 during detent operation and to port 212 of the first to second shift valve 205. The servo passage 137 as in neutral insures release of second servo 310 and band 60. Accumulator valve 285 supplies accumulator pressure in passage 134 to accumulator chamber 331 of first and reverse servo 320 to provide an accumulator bias proportional to torque demand. Thus in drive range, the first and reverse servo 320 and second servo 310 are not engaged and used for drive but only for their accumulator function.

Drive passage 121 also delivers line pressure to chamber 43 of front unit forward drive clutch 44 to engage the clutch. With clutch 44 engaged, one-way brake 82 locks up to prevent rotation of planet carrier 77 and one-way first gear drive is obtained through the planetary gearing. With the detent control valve 250 in non-detent or open position, modulator pressure from passage 123 is conducted through ports 256 and 257 to shift modulator I passage 130 to port 283 of the third to second downshift valve 275. In first and second speeds but not in third 3-2 valve 275 is always biased by spring 279 to connect port 283 to port 282 to connect modulator I pressure passage 130 to modulator II passage 129 connected to the modulator plugs modulator and detent valve elements 215 and 242 of the first to second and second to third shift valves 205 and 230, to yieldably bias the shift valves to their downshift position. Detent pressure delivery passage 128 in normal throttle operation is connected to exhaust by ports 268, 270 of detent regulator valve 260 and exhausted low range passage 124 so there is no detent pressure and low range pressure and to provide the exhaust passage for regulation overage fluid from modulator valve 170, accumulator valve 285 and 1–2 shift valve regulator valve element 216.

At some vehicle speed, depending upon throttle opening, governor pressure acting upon the end of land 206a will cause the first to second shift valve element 206 to move to its upshift position wherein drive pressure supply passage 121, which was blocked by land 206b in first, is connected to second and third gear drive passage 127 through ports 212 and 211. Passage 127 leads to blocked pressure supply port 237 of the second to third gear shift valve 230 and through the restriction of timing device 349 to apply chamber 342 of second band servo 310 but it will not be engaged since servo pressure from passage 137 is in release chamber 341 and through the restriction of timing device 348 to chamber 68 and to release accumulator chamber 333 to accumulate fluid and maintain release of low and reverse servo 320 so second gear disc brake 65 for one-way device 63 is smoothly engaged for one-way second drive. Considering the condition of low and reverse servo 320 and its accumulator piston 328 at the moment before the first to second shift valve 205 is upshifted from its downshift position, the first to second accumulator control valve 285 is effective to deliver accumulator pressure from drive pressure passage 121 to accumulator passage 134 by way of ports 297 and 295 of valve 285. Accumulator pressure, admitted to the end of land 286c through port 294 assists light spring 292 to move the valve element 286 against heavy spring 289 and modulator pressure bias to a position wherein it tends to block off port 297 from port 295 and to connect port 295 to port 296 connected to low range passage 124 exhausted at manual valve 150. Accumulator control valve 285 acts as a pressure regulating valve which maintains a pressure less than line pressure and greater than, and increasing with, modulator pressure in passage 134 in drive and intermediate ranges.

Prior to movement of the first to second shift valve 205 to its upshift position, intermedite clutch chamber 68 and release chamber 333 are connected to exhaust through branch passage 127a, timing device 348 without restriction, 2–3 passage 127 and ports 211 and 210 of 1–2 shift valve 205. The accumulator pressure feed by accumulator passage 134 to accumulator bias chamber 331 acts on accumulator piston 328 to stroke this piston, assisted by accumulator spring 332 to engage stop portions on base 325 of apply piston 322, in release and discharged position as shown. When on a 1–2 shift line pressure is supplied by 2–3 passage 127, 127a to release and accumulator chamber 333, accumulator piston 328 will be forced upwardly or in an accumulator charging direction to charge the accumulator. Apply chamber 327 at this time is connected to exhaust through passage 126 and either low range pressure passage 124 or reverse passage 125 depending upon the position of the ball of shuttle valve 355. The accumulator piston 328, controlled by accumulator pressure from valve 285 and spring 332 provides smooth engagement of second speed disc brake 65 which causes the one-way brake 63 to be effective to establish second gear drive. With only disc brake 65 and forward clutch 44 engaged, the one-way brake 63 will provide free-wheeling on overrun, a one-way second gear drive in drive range. The brake band 60 for two-way second gear drive is not engaged in drive range.

In the second band servo 310, the manual valve supplied servo pressure in passage 137 continues to be supplied to release chamber 341 to hold servo 310 released and 2–3 pressure passage 127, 127b supplies the same main pressure to apply chamber 342. Since the same main pressure is on opposite equal areas of apply piston 311, it does not move and there is no further accumulator effect on 2–3 passage 127 pressure to modify the above described accumulator effect provided in the low reverse servo 320 and second band servo 310 does not apply the second band 60.

The 2–3 passage 127 has a restricted branch connected to supply port 237 of the 2–3 shift valve 230 so the 1–2 shift provides a supply to 2–3 shift valve 230. Only third clutch 48 is engaged for a drive range upshift from second drive to third or direct drive. At some vehicle speed governor pressure acting upon land 231a of the second to third shift valve 230 will be effective to move the valve against the spring 246 force and modulator pressure force on modulator plug or valve element 242 to its upshift position. With valve 230 upshifted, 2–3 drive passage 127, previously blocked by land 231b, is connected to drive clutch passage 132 by way of ports 237 and 236 of valve 230.

Line pressure in third clutch passage 132 is conducted without restriction through timing device 347, to that portion of passage 132 leading to the relatively small inner chamber 55 of third clutch 48 piston 54 and to accumulator chamber 343 of the overrun band 60 apply servo 310 to charge the accumulator chamber 343 to control the pressure rise in chamber 55 for smooth engagement of third clutch 48 for third speed or direct drive.

In third gear or direct drive, light throttle operation, the pressure in third clutch passage 132 will move 3-2 downshift valve 275 against spring 279 to connect modulator II passage 129 to exhaust through ports 282, 281, detent passage 128 and ports 268 and 270 of detent regulator valve 260 and low range passage 124. At heavy throttle (prior to detent) the third to second downshift valve will be biased by modulator I pressure in passage 130 and by spring 279 to admit modulator pressure from modulator I passage 130 to modulator II passage 129 tending to downshift the second to third shift valve 230. Thus in normal operation prior to detent operation, valve 275 serves to cut off modulator pressure to the second to third shift valve 230 when operating in third drive, light throttle. However, when operating in third drive heavy throttle, 3-2 valve 275 is positioned to supply modulator pressure for downshift bias on the 2-3 shift valve 230 for a 3-2 shift.

Considering a normal closed or low part throttle downshift from third to second gear drive, at a relatively low vehicle speed, spring 246 acting on modulator valve element 242 and the second to third shift valve element 231 will be effective to overcome the hysteresis effect of line pressure acting on land 231b and governor pressure acting on land 231a to move valve element 231 to its downshift or second speed position. At high throttle 3-2 valve 275 supplies modulator II pressure passage 129 to the 2-3 modulator valve 242 for a downshift of the 2-3 shift valve 230 at a higher speed. The 2-3 shift valve will thereupon be effective to block off port 237 of the 2–3 delivery 127 and connect direct clutch passage 132 to exhaust through ports 236, 235, reverse passage 125 and ports 161, 160 of manual valve 150. In exhausting passage 132, timing device 347 provides a restriction effective to control the release of third clutch 48 to prevent runaway and to smooth engagement of one-way brake 63 as second friction brake 65, which is engaged in both second and third, establishes second drive. On such a normal downshift from third to second gear drive port 280 of the third to second downshift valve 275 is connected by exhausted passage 132 to exhaust on the downstream side of the restriction of timing device 347 to permit unrestricted rapid exhaust of fluid from the end of land 276a. The third to second downshift valve 275 quickly admits modulator pressure from passage 130 to modulator II passage 129 so that this pressure is effective upon both regulator plugs of both shift valves during the shift to prevent hunting of the 2-3 shift valve.

On a normal closed or part throttle second to first gear downshift, the first to second shift valve element 206 will at some vehicle speed downshift to its first gear drive position. Upon movement of the 1-2 shift valve element 206 to its downshift position, drive passage 121 and port 212 will be blocked by land 206b and 2–3 passage 127 will be connected to exhaust by way of ports 211 and 210. The exhaust of 2–3 passage 127 exhausts apply chamber 342 of second servo 310 through passage 127b and timing device 349 with unrestricted flow, but since servo pressure remains supplied to release chamber 341 the second servo 310 remains released. The exhaust of 2–3 passage 127 also exhausts through branch 127a and timing device 348 with unrestricted flow, the second disc brake apply chamber 68 and accumulator or release chamber 333 which permits accumulator piston 328 to move in its discharge stroke to maintain pressure in chamber 68 to hold second engaged sufficiently and very briefly until first drive is engaged. Since the one-way brake 82 is relied upon for first gear drive, quite rapid release of disc brake 65 provides a smooth shift.

In drive range operation, since the low range passage 124 is exhausted, the rear transmission gearing 36' is in neutral.

DRIVE RANGE DETENT SHIFTS

In addition to the normal or part throttle upshifts and downshifts described above, there are detent downshifts, a downshift under full power for rapid vehicle acceleration. Upon depressing the accelerator pedal to detent position, past full throttle position for maximum acceleration, solenoid valve 306 is energized to open exhaust port 307 to drop the line pressure in branch passage 120a acting on the end of land 251a of detent control valve 250. Restriction 305 prevents loss of line pressure in passage 120. The drop of pressure in passage 120a permits spring 266 to move the detent regulator valve 260 and detent control valve 250 to their detent positions. Line pressure from passage 121 is supplied to the detent regulator valve 260 which regulates and supplies detent pressure to detent passage 128 and shift modulator I passage 130 at a fixed regulated intermediate pressure when operating in intermediate and drive range detent operation. Detent pressure acting on land 251b moves detent control valve element 251 to its detent position blocking modulator passage 123 at its port 256 and the detent regulator valve in regulating position will not contact the detent control valve 250.

During detent shifting, the third to second downshift valve 275 has no function. Detent pressure in modulator passage 130 will not move 3-2 valve 275. Since the same detent pressure is admitted to shift modulator I passage 130 and detent passage 128 by detent pressure regulator valve 260, 3-2 valve 275 in both positions connects detent pressure, either from passage 128 or from passage 130 to modulator II passage 129. During detent operation, the detent pressure supplied by detent passage 128 and shift modulator II passage 129 will act on the modulator plug or valve element 215 of 1–2 shift valve 205 and modulator plug or valve element 242 of the 2–3 shift valve 230 to provide a downshift at a high detent downshift speed during detent operation which is higher than downshift speed during variable throttle operation and to provide detent pressure hysteresis so a detent upshift occurs at a speed higher than the detent downshift speed as explained above with regard to each shift valve.

INTERMEDIATE RANGE

In intermediate range the manual valve 150 from main passage 120 supplies drive range passage 121 and intermediate range passage 136 and the other range passages, low 124 and reverse 125 and servo passage 137 are exhausted. The main line 120, as in neutral and drive range, supplies modulator valve 170 and detent control valve 250 so there is modulator pressure in passage 123 varying with throttle position which is connected by detent control valve 250 to modulator I passage 130. The drive range passage 121 remains connected as in drive range to governor 200 so there is governor pressure varying with speed in governor passage 122, to chamber 43 to engage forward clutch 44, which, with one-way device 82, establishes first speed one-way drive, to supply 1–2 accumulator valve 285 to provide accumulator pressure varying with modulator pressure in accumulator passage 134, to detent regulator valve 260 so in detent operation detent pressure is provided in detent passage 128 and modulator I and II passages 130, 129 and to supply the 1–2 shift valve 205.

The intermediate range passage 136 is connected by shuttle valve 116 in place of modulator pressure to boost control plug 101 of main regulator valve 90 to increase main line pressure to a higher constant value and to 2–3 shift valve 230 at port 238 to act on the larger land 231b to hold 2–3 shift valve element 231 in downshift position to prevent a 2–3 shift at any speed.

The 1–2 shift valve 205 functions in the same way as in drive range under the governor pressure bias tending to cause an upshift against the opposing bias varying with the modulator pressure during variable throttle operation and the opposing detent pressure bias during detent operation.

In the first speed position of 1–2 shift valve 205, first drive is provided as in drive range, as drive range passage 121 supplies main pressure to engage forward clutch 44 and one-way device 82 is effective to provide one-way first speed drive. Though servo passage 137 is exhausted at the manual valve 150, the release of retraction spring 315 holds second servo 310 disengaged and as in drive range low and reverse range passages 124 and 125 are exhausted, so second brake band 60 is disengaged. Also 2–3 passage 127 is exhausted as in first speed drive range so chamber 68 is exhausted and second disc brake 65 is disengaged and release chamber 333 of low reverse servo 320 is exhausted.

On upshift of 1–2 shift valve 205, as in drive range, it connects drive range passage 121 to 2–3 passage 127 to apply second disc brake 65 to make one-way device 63 effective to provide a one-way second speed drive. Passage 127 is also connected, as in drive range, to release and accumulator chamber 333 to charge stroke accumulator piston 328 to delay and smooth engagement of second disc brake 65. Also passage 127 is connected through timing device 349 with restriction to apply chamber 342 of second servo 310, which in intermediate range, since the release chamber 341 is exhausted through servo passage 137, moves apply piston 311 through a long stroke to engage abutment 316 to move apply rod 314 to engage second band 60 to provide two-way second speed drive.

Thus when the vehicle is stated in intermediate range the forward clutch 44 is engaged and first speed one-way device 82 is effected to provide first speed one-way drive as in drive range. The 1–2 shift valve 205 will function in response to governor pressure and opposing torque demand forces provided by shift modulator II pressure from passage 129 or detent pressure from passage 128 for shifts between first and second as in drive range. On a shift from first to second the second forward clutch 44 remains engaged. Disc brake 65 is engaged with time delay provided by the accumulator and release chamber 333 of low and reverse servo 320 making second one-way device 63 effective to provide a one-way second drive as in drive range and additionally a two-way second drive is provided by a second band servo 310 engaging second band 60 to provide two-way second drive timed by 2-3 fluid having flow restricted by timing device 349 to apply chamber 342 moving apply piston 311 through a long stroke moving fluid out of release chamber 341 through unrestricted timing device 350 to provide a slightly longer time delay. Thus the one-way second drive effects the shift and then second drive substantially immediately is made a two-way drive.

Intermediate range is also used to increase engine braking. When operating, particularly during downhill coasting, in third speed drive range, a shift to intermediate range is made to provide a two-way second drive to increase engaging braking. Though prior to such a shift the upshifted 1-2 shift valve 205 supplies 2-3 passage 127 so the second disc brake 65 is engaged, as in drive range third drive, on release of third clutch 48 during overrun the one-way device 63 is ineffective, so no overrun drive is established. Since intermediate pressure in passage 136 donwshifts the 2-3 shift valve 230, third clutch passage 132 is exhausted as in drive range. Also servo pressure in passage 137 is exhausted at manual valve 150, so 2-3 passage 127 pressure fluid previously supplied to apply chamber 342 can provide additional flow through the restriction of timing device 349 to move apply piston 311 through the stroke moving fluid out of release chamber 341 through unrestricted timing device 350 to engage second band 60 for a two-way second drive. The accumulator piston 312 also is stroked by 2-3 pressure to supply pressure between the restriction of timing device 347 and chamber 55 of clutch 48 to delay the release of third clutch 48 relative to engagement of second band 60.

In intermediate range, since the low range passage 124 remains exhausted, the rear transmission gearing 36' remains in neutral for front wheel drive.

LOW RANGE OPERATION

With the drive range selector valve 150 positioned for low range operation, line pressure is additionally admitted to low range pressure passage 124 and continues to be admitted to intermediate range passage 136 and drive range passage 121 as in intermediate range. Low range passage 124 admits line pressure through ports 269 and 270 of detent regulator valve 260 so that the whole assembly is moved to the right-hand low range non-regulating position such that line pressure from drive passage 121 is admitted through ports 267 and 268 to detent passage 128, and modulator I passage 130 which is connected to modulator II passage 129 at the 3-2 valve 275. Since detent pressure passage 128 in other ranges provided the exhaust for the modulator valve 170, the modulator valve does not regulate and modulator passage 123 has line pressure. Line pressure is also conducted through passage 124 to port 296 of the first to second accumulator control valve 285 to cause valve 285 to deliver full line pressure through accumulator passage 134 to accumulator bias chamber 331 to act on accumulator piston 328. Thus in low range operation, the detent pressure passage 128, modulator pressure passage 123, modulator I and II passages 130, 129, accumulator pressure passage 134 become boosted line pressure, rather than the lower detent modulator and accumulator pressures in intermediate and drive ranges. The 2-3 shift valve 230 remains held in second position by intermediate pressure supplied by passage 136 as in intermediate range. Drive range line pressure continues to be supplied by drive range passage 121 to engage forward clutch 44 and to governor 200 to provide governor pressure in passage 122 as in intermediate and drive ranges. Low range oil in passage 124 is conducted through shuttle valve 355 to passage 126 to apply chamber 327 of the low and reverse band 320 to apply band 79 and blocked from passage 125 to establish a two-way first speed drive.

In low range, line pressure in modulator II passage 129 is connected to port 218 and in detent passage 128 is conducted to port 223 of the first to second gear shift valve assembly 205 to act on 1-2 detent valve element 215 to bias the 1-2 element valve 206 to its downshift position such that the second to third gear drive passage 127 is connected to exhaust through ports 211 and 210. Line pressure in passage 124 is also conducted to port 213 of the first to second shift valve 205 where it acts on the unbalanced area of land 206c and tends to move the valve element 206 from its downshift position with a small force to reduce the downshift bias on the 1-2 detent valve element 215 for a proper net downshift bias. This net downshift bias provides an upshift from first to second at a proper speed, higher than in other ranges when operating in low range.

On such a low range upshift the line pressure supplied by modulator II passage 129 is blocked by land 215d and does not act on the unbalanced area of lands 215d and e so there is hysteresis on this range shift by main line pressure on the areas as in detent operation. This is also desirable to protect the transmission against a downshift to first gear at too high a vehicle speed. In case the manual range valve 150 is moved from drive or intermediate range to low range when the vehicle is operating at a speed above a predetermined vehicle speed, the transmission 36 will not downshift to first but only to the two-way second speed, as provided in intermediate range.

In low range, low range passage 124 supplies apply chamber 43' to engage the forward clutch 44' and one-way device 82' is effective to provide a one-way first speed drive in the rear transmission gearing 36' which functions with the above two-way first speed drive in the front transmission gearing 36 to provide a four wheel drive. Since the same fluid pressure supply and the same forward clutch and gearing structure, the friction plates, apply piston and cylinder, especially are used in both transmissions, the drive to both the front and rear wheels is simultaneously initiated with the same torque characteristics to avoid wheel slip. In low range on an automatic speed responsive upshift to second speed in the front transmission the one-way drive in the rear transmission will be automatically disengaged by disengagement or overrun of the first speed one-way device 82' in the rear transmission.

REVERSE

With manual valve 150 positioned for reverse operation, drive range passage 121, intermediate range passage 136 and low range passage 124 are connected to exhaust 167. Line pressure supply passage 120 is connected to reverse passage 125 and servo passage 137.

Line pressure in reverse passage 125 is conducted through branch passage 125a and restricting timing device 346 to the large area outer chamber 56 of the direct drive clutch servo 53 to engage clutch 48 and through shuttle valve 355 to passage 126 through unrestricted timing device 345 to apply chamber 327 of the low and reverse servo 32 to apply band 79 to quickly establish front transmission reverse drive smoothly at a low initial torque capacity and then past one-way seal 57 to the inner chamber 55 to increase torque capacity. Shuttle valve 355 will block off low range passage 124 to prevent loss of line pressure through passage 124. Reverse oil is also conducted through passage 125 to port 104 of the line pressure regulator valve assembly 90 to boost the line pressure higher than in low and intermediate ranges, and is conducted to port 238 of the second to third shift valve 230. With valve 230 in its downshift position, line pressure is admitted through ports 235 and 236 to passage 132, freely through timing device 347 to inner chamber 55 of the clutch servo of clutch 48 and to accumulator chamber 343 of second servo 310 to delay application of this torque increasing pressure. Thus, in reverse operation, both chambers 56 and 55 are supplied with line pressure to engage clutch 48 to provide the required high torque transmitting capacity in reverse.

In reverse range, since the reverse range passage 125 is connected to apply chamber 327' of reverse band servo 336 of the rear transmission gearing 36' and to both chambers 55', 56', as the intermediate seal 57 is omitted and passage 132 omitted and its port blocked by plug 132'a, the clutch 48' and band 79' are applied to engage a two-way reverse drive in the rear transmission gearing 36'. Since the same source of fluid pressure and the clutch, band, gearing and their fluid pressure apply devices are structurally the same, the front and rear wheel drives are simultaneously engaged with the same torque characteristics.

MODIFICATION I

The modification, FIG. 3, functions basically like the above described four wheel drive transmission but four wheel drive is provided in first speed in all forward ranges as indicated in Chart III above. Since the drive range passage 121' is connected in low, intermediate and drive ranges, to the forward clutch apply chamber 43' to engage forward clutch 44' which causes one-way device 82' to provide a one-way first speed drive in the rear transmission 36' in all forward ranges. In drive and intermediate ranges, a one-way first speed drive is provided in both transmissions for a first speed four wheel drive. In low range the front transmission 36 provides a two-way first speed drive and with the one-way first speed in the rear transmission for a four wheel drive. On an automatic upshift in the front transmission to second speed which causes a shift to neutral in the rear transmission, a second speed two wheel drive in all ranges is provided. On this shift the front transmission in second increases vehicle speed and the rear transmission one-way device 82' overruns to provide neutral. This type drive is provided in all ranges with the upshift in drive and intermediate ranges at the normal automatic shift speed and torque demand values and the low range upshift at a higher speed. Thus the operator may select three modes of forward four wheel drive. Reverse is the same as in the above first embodiment.

MODIFICATION II

In another modification, FIG. 4, the intermediate range passage 136' is connected to apply chamber 43' of forward clutch 44' to similarly engage first speed drive in the rear transmission in intermediate and low range drive to provide first speed four wheel drive and two wheel drive in higher speeds in these ranges as shown in Chart IV above. This modification provides in drive range normal two wheel drive with normal automatic shifting by the front transmission and reverse four wheel drive as in the first embodiment described above. In intermediate range four wheel drive with one-way drive in both transmissions until a normal speed and torque demand responsive upshift to one-way second speed in the front transmission provides neutral in the rear transmission for two wheel drive. In low ramge. two-way first speed drive in the front transmission and one-way first speed drive in the rear transmission provides first speed four wheel drive until a manual upshift or a high speed upshift to second speed in the front transmission places the rear transmission in neutral. Thus the operator may select two modes of four wheel drive and one mode of two wheel drive.

It will be appreciated that other modifications of the invention may be made.

It is claimed:

1. In a transmission assembly for two wheel and four wheel drives: an input; a main output; an auxiliary output; a main transmission driven by said input having fluid operated means providing first speed drive and second speed drive for driving said main output; an auxiliary transmission having first speed drive for driving said auiliary output; a source of regulated fluid pressure; governor means connected to said main output providing a governor speed signal proportional to said main output speed; shift control means connected to said source, said governor means, main transmission and said auxiliary transmission and operative in a forward driving speed drive range for automatic shifting between a first speed drive position at low speeds and a second speed drive position at high speeds in response to said governor speed signal to control said main transmission and said auxiliary transmission for operation in said first speed drive position at low speeds to establish said first speed drive in said main transmission and said first speed drive in said auxiliary transmission to provide a first speed four wheel drive and for operation at a predetermined higher speed to upshift to said second speed drive position to provide an automatic upshift to establish said second speed drive in said main transmission and to discontinue drive in said auxiliary transmission to provide a second speed main two wheel drive.

2. In a transmission assembly for two wheel and four wheel drives; an input, a main output; an auxiliary output; a main transmission driven by said input having fluid operated means providing one-way and two-way first speed drive, one-way and two-way second speed drive, two-way third speed drive and two-way reverse drive driving said main output; an auxiliary transmission having one-way first speed drive and two-way reverse drive provided by duplicate components as in said main transmission for driving said auxiliary output; a source of regulated fluid pressure; governor means connected to said main output providing a governor signal proportional to main output speed; torque demand means providing a torque demand signal proportional to torque demand on a driving engine; shift control means connected to said source, said governor means, said torque demand means, and said main and auxiliary transmissions and operative in a drive range position to sequentially establish said one-way first speed drive, said one-way second speed drive and said two-way third speed drive in response to said speed and torque demand signals in said main transmission and neutral in said auxiliary transmission for full automatic shifting main two wheel drive, in intermediate range position to sequentially establlish one-way first speed drive, two-way second speed drive in response to said speed and torque demand signals in said main transmission and neutral in said auxiliary transmission for limited automatic shifting main two wheel drive and in low range position to selectively establish said two-way first speed drive with an upshift at a predetermined higher speed than normal speed automatic upshift to second speed drive in said main transmission and to provide a one-way first speed drive in said auxiliary transmission providing a first speed four wheel drive operative in response to upshift in said main transmission to cause overrun and discontinue drive in said auxiliary transmission to provide second speed main two wheel drive and in reverse position to provide two-way reverse drive in both transmissions to provide four wheel reverse drive.

3. In a transmission assembly for two wheel and four wheel drives; an input, a main output; an auxiliary output; a main transmission driven by said input having fluid operated means providing one-way and two-way first speed drive, one-way and two-way second speed drive, two-way third speed drive and two-way reverse drive driving said main output; an auxiliary transmission having one-way first speed drive and two-way reverse drive provided by duplicate components as in said main transmission for driving said auxiliary output; a source of regulated fluid pressure; governor means connected to said main output providing a governor signal proportional to main output speed; torque demand means providing a torque demand signal proportional to torque demand on a driving engine; shift control means connected to said source, said governor means, said torque demand means, and said main and auxiliary transmissions and operative in a drive range position to sequentially establish said one-way first speed drive, said one-way second speed drive and said two-way third speed drive in response to said speed and torque demand signals in said main transmission and to establish said one-way first speed drive in said auxiliary transmission during the period said one-way first speed drive is established in said main transmission to provide four wheel first speed drive and no drive in said auxiliary transmission when other drives are established in said main transmission for full automatic shifting main two wheel drive, in intermediate range position to sequentially establish one-way fist speed drive, two-way second speed drive in response to said speed and torque demand signals in said main transmission and to establish said one-way first speed drive in said auxiliary transmission during the period said one-way first speed drive is established in said main transmission to provide four wheel drive and no drive in said auxiliary transmission when the other drives are established in said main transmission for limited automatic shifting main two wheel drive and in low range position to selectively establish said two-way first speed drive with an upshift at a predetermined higher speed than normal speed automatic upshift to second speed drive in said main transmission and to provide a one-way first speed drive in said auxiliary transmission providing a first speed four wheel drive operative in response to upshift in said main transmission to cause overrun and discontinue drive in said auxiliary transmission to provide second speed main two wheel drive and in reverse position to provide two-way reverse drive in both transmissions to provide four wheel reverse drive.

4. In a transmission assembly for two wheel and four wheel drives; an input, a main output; an auxiliary ouput; a main transmission driven by said input having fluid operated means providing one-way and two-way first speed drive, one-way and two-way second speed drive, two-way third speed drive and two-way reverse drive driving said main output; an auxiliary transmission having one-way first speed drive and two-way reverse drive provided by duplicate components as in said main transmission for driving said auxiliary output; a source of regulated fluid pressure; governor means connected to said main output providing a governor signal proportional to main output speed; torque demand means providing a torque demand signal proportional to torque demand on a driving engine; shift control means connected to said source, said governor means, said torque demand means, and said main and auxiliary transmissions and operative in a drive range position to sequentially establish said one-way first speed drive, said one-way second speed drive, said two-way third speed drive in response to said speed and torque demand signals in said main transmission and neutral in said auxiliary transmission for full automatic shifting main two wheel drive, in intermediate range position to sequentially establish one-way first speed drive, two-way second speed drive in response to said speed and torque demand signals in said main transmission and to establish said one-way first speed drive in said auxiliary transmission during the period said one-way first speed drive is established in said main transmission to provide four wheel drive and no drive in said auxiliary transmission when the other drives are established in said main transmission for limited automatic shifting main two wheel drive and in low range position to selectively establish said two-way first speed drive with an upshift at a predetermined higher speed than normal speed automatic upshift to second speed driven in aid main transmission and to provide a one-way first speed drive in said auxiliary transmission providing a first speed four wheel drive operative in response to upshift in said main transmission to cause overrun and discontinue drive in said auxiliary transmission to provide second speed main two wheel drive and in reverse position to provide two-way reverse drive in both transmissions to provide four wheel reverse drive.

5. In a transmission assembly for two wheel and four wheel drives; an input, a main output; an auxiliary output; a main transmission driven by said input having drive establishing means for driving said main output including fluid operated forward drive means engaged with one-way drive means for one-way first speed drive, with fluid operated two-way first speed drive means for two-way first speed drive, with fluid operated one-way second speed drive means for one-way second speed drive, with fluid operated two-way second speed drive means for two-way second speed drive and with fluid operated two-way third speed drive means for two-way third speed drive and operative on engagement of said fluid operated two-way first speed drive means and said two-way third speed drive means for reverse drive; an auxiliary transmission having duplicate components as in said main transmission having drive establishing means for driving said auxiliary output including a fluid operated forward drive means engaged with one-way drive means for one-way first speed drive and fluid operated two-way third speed drive means and fluid operated two-way first speed drive means engaged together for two-way reverse drive; a source of regulated fluid pressure; governor means connected to said main output providing a governor signal proportional to main output speed; torque demand means providing a torque demand signal proportional to torque demand on a driving engine; manual valve means connected to said source and having a servo line, a drive range line connected to said forward drive means of said main transmission an intermediate range line, a low range line and a reverse line connected to said two-way third speed drive means and two-way first speed drive means of both transmissions and operative to supply source pressure in drive range position to said drive range line, in intermediate range to said drive and intermediate range lines, in low range to said drive, intermediate and low range lines, in reverse to said reverse line and in reverse, neutral and drive ranges to said servo line connected to disable said fluid operated two-way second speed drive means; automatic shift control means connected to said range lines, said governor means, said torque demand means, and all of said fluid operated speed drive means of said main transmission and operative with the establishment of said forward drive means by said manual valve means in a drive range position to seuqentially establish said one-way first speed drive means for one-way first speed drive, said fluid operated one-way second speed drive means for one-way second speed drive and said fluid operated two-way third speed drive means for said two-way third speed drive in response to said speed and torque demand signals in said main transmission, in intermediate range position to sequentially establish said one-way first speed drive means for one-way first speed drive and said fluid operated two-way second speed drive means for two-way second speed drive in response to said speed and torque demand signals in said main transmission and in low range position to selectively establish said fluid operated two-way first speed drive means for two-way first speed drive at lower speeds with an upshift, at a predetermined higher speed than normal speed automatic upshift, to establish said fluid operated, two-way second speed drive means for second speed drive in said main transmission and said manual valve means in one range position supplying said fluid operated forward drive means and said one-way first speed drive means of said auxiliary transmission operative to provide a one-way first speed drive in said auxiliary transmission for a first speed four wheel drive in said one range and operative in response to upshift of said automatic shift control means for said main transmission to cause overrun and discontinue drive in the auxiliary transmission to provide two-way second speed main two wheel drive and in reverse position to provide two-way reverse drive in both transmissions to provide four wheel reverse drive.

6. In a transmission assembly for two wheel and four wheel drives; an input, a mian output; an auxiliary output; a main transmission driven by said input having drive establishing means for driving said main output including fluid operated forward drive means engaged with one-way drive means for one-way first speed drive, with fluid operated two-way first speed drive means for two-way first speed drive, with fluid operated one-way second speed drive means for one-way second speed drive, with fluid operated two-way second speed drive means for two-way second speed drive and with fluid operated two-way third speed drive means for two-way third speed drive and operative on engagement of said fluid operated two-way first speed drive means and said two-way third speed drive means for reverse drive; and auxiliary transmission having duplicate components as in said main transmission having drive establishing means for driving said auxiliary output including a fluid operated forward drive means engaged with one-way drive means for one-way first speed drive and fluid operated two-way third speed drive means and fluid operated two-way first speed drive means engaged together for two-way reverse drive; a source of regulated fluid pressure; governor means connected to said main output providing a governor signal proportional to main output speed; torque demand means providing a torque demand signal proportional to torque demand on a driving engine; manual valve means connected to said source and having a servo line, a drive range line connected to said forward drive means of said main transmission, an intermediate range line, a low range line connected to said forward drive means of said auxiliary transmission and a reverse range line connected to said two-way third speed drive means and two-way first speed drive means of both transmissions and operative to supply source pressure in drive range position to said drive range line, in intermediate range to said drive and intermediate range lines, in low range to said drive, intermediate and low range lines, in reverse range to said reverse range line and in reverse, neutral and drive ranges to said servo line connected to disable said fluid operated two-way second speed drive means; automatic shift control means connected to said range lines, said governor means, said torque demand means, and all of said fluid operated speed drive means of said main transmission and operative with the establishment of said forward drive means by said manual valve means in a drive range position to sequentially establish said one-way first speed drive means for one-way first speed drive, said fluid operated one-way second speed drive means for one-way second speed drive and said fluid operated two-way third speed drive means for said two-way third speed drive in response to said speed and torque demand signals in said main transmission and with said manual valve means establishing neutral in said auxiliary transmission for full automatic shifting main two wheel drive, in intermediate range position to sequentially establish said one-way first speed drive means for one-way first speed drive and upshift to said fluid operated two-way second speed drive means for two-way second speed drive in response to said speed and torque demand signals in said main transmission and with said manual valve means establishing neutral in said auxiliary transmission for limited automatic shifting main two wheel drive and in low range position to selectively establish said fluid operated two-way first speed drive means for two-way first speed drive at lower speeds with an upshift, at a predetermined higher speed than normal speed automatic upshift, to establish said fluid operated, two-way second speed drive means for second speed drive in said main transmission and with said manual valve means supplying said fluid operated forward drive means and said one-way first speed drive means of said auxiliary transmission operative to provide a one-way first speed drive in said auxiliary transmission for a first speed four wheel drive and operative in response to upshift of said automatic shift control means of said main transmission to cause overrun and discontinue drive in the auxiliary transmission to provide two-way second speed main two wheel drive and in reverse position to provide two-way reverse drive in both transmissions to provide four wheel reverse drive.

7. In a transmission assembly for two wheel and four wheel drives; an input, a main output; an auxiliary output; a main transmission driven by said input having drive establishing means for driving said main output including fluid operated forward drive means engaged with one-way drive means for one-way first speed drive, with fluid operated two-way first speed drive means for two-way first speed drive, with fluid operated one-way second speed drive means for one-way second speed drive, with fluid operated two-way second speed drive means for two-way second speed drive and with fluid operated two-way third speed drive means for two-way third speed drive and operative on engagement of said fluid operated two-way first speed drive means and said two-way third speed drive means for reverse drive; an auxiliary transmission having duplicate components as in said main transmission having drive establishing means for driving said auxiliary output including a fluid operated forward drive means engaged with one-way drive means for one-way first speed drive and fluid operated two-way third speed drive means and fluid operated two-way first speed drive means engaged together for two-way reverse drive; a source of regulated fluid pressure; governor means connected to said main output providing a governor signal proportional to main output speed; torque demand means providing a torque demand signal proportional to torque demand on a driving engine; manual valve means connected to said source and having a servo line, a drive range line connected to said forward drive means of said main and auxiliary transmissions an intermediate range line, a low range line and a reverse range line connected to said two-way third speed drive means and two-way first speed drive means of both transmissions and operative to supply source pressure in drive range position to said drive range line, in intermediate range to said drive and intermediate range lines, in low range to said drive, intermediate and low range lines, in reverse range to said reverse range line and in reverse, neutral and drive ranges to said servo line connected to disable said fluid operated two-way second speed drive means; automatic shift control means connected to said range lines, said governor means, said torque demand means, and all of said fluid operated speed drive means of said main transmission and operative with the establishment of said forward drive means in both transmissions by said manual valve means in a drive range position to sequentially establish said one-way first speed drive means in both transmissions for one-way first speed drive in both transmissions for four wheel drive, said fluid operated one-way second speed drive means for one-way second speed drive only in said main transmission and said fluid operated two-way third speed drive means for said two-way third speed drive only in said main transmission in response to said speed and torque demand signals in said main transmission, in intermediate range position to sequentially establish said one-way first speed drive means in both transmissions for one-way first speed drive in both transmissions for four wheel drive and upshift of said fluid operated two-way second speed drive means for only two-way second speed drive in response to said speed and torque demand signals in said main transmission and in low range position to selectively establish said fluid operated two-way first speed drive means for two-way first speed drive at lower speeds with an upshift, at a predetermined higher speed than normal speed automatic upshift, to establish said fluid operated, two-way second speed drive means for second speed drive in said main transmission and with said manual valve means supplying said fluid operated forward drive means and said one-way first speed drive means of said auxiliary transmission operative to provide a one-way first speed drive in said auxiliary transmission for a first speed four wheel drive and operative in response to upshift of said automatic shift control means of said main transmission to cause overrun and discontinue drive in the auxiliary transmission to provide two-way second speed main two-wheel drive and in reverse position to provide two-way reverse drive in both transmissions to provide four wheel reverse drive.

8. In a transmission assembly for two wheel and four wheel drives; an input; a main output; an auxiliary output; a main transmission driven by said input having drive establishing means for driving said main output including fluid operated forward drive means engaged with one-way drive means for one-way first speed drive, with fluid operated two-way first speed drive means for two-way first speed drive, with fluid operated one-way second speed drive means for one-way second speed drive, with fluid operated two-way second speed drive means for two-way second speed drive and with fluid operated two-way third speed drive means for two-way third speed drive and operative on engagement of said fluid operated two-way first speed drive means and said two-way third speed drive means for reverse drive; an auxiliary transmission having duplicate components as in said main transmission having drive establishing means for driving said auxiliary output including a fluid operated forward drive means engaged with one-way drive means for one-way first speed drive and fluid operated two-way third speed drive means and fluid operated two-way first speed drive means engaged together for two-way reverse drive; a source of regulated fluid pressure; governor means connected to said main output providing a governor signal proportional to main output speed; torque demand means providing a torque demand signal proportional to torque demand on a driving engine; manual valve means connected to said source and having a servo line, a drive range line connected to said forward drive means of said main transmission, an intermediate range line connected to said forward drive means of said auxiliary transmission, a low range line and a reverse line connected to said two-way third speed drive means and two-way first speed drive means of both transmissions and operative to supply source pressure in drive range position to said drive range line, in intermediate range to said drive and intermediate range lines, in low range to said drive, intermediate and low range lines, in reverse range to said reverse range line and in reverse, neutral and drive ranges to said servo line connected to disable said fluid operated two-way second speed drive means; automatic shift control means connected to said range lines, said governor means, said torque demand means, and all of said fluid operated speed drive means of said main transmission and operative with the establishment of said forward drive means by said manual valve means in a drive range position to sequentially establish said one-way first speed drive means for one-way first speed drive, said fluid operated one-way second speed drive means for one-way second speed drive and said fluid operated two-way third speed drive means for said two-way third speed drive in response to said speed and torque demand signals in said main transmission and with said manual valve means establishing neutral in said auxiliary transmission for full automatic shifting main two wheel drive, in intermediate range position to sequentially establish said one-way first speed drive means for one-way first speed drive and upshift to said fluid operated two-way second speed drive means for two-way second speed drive in response to said speed and torque demand signals in said main transmission and with said manual valve means supplying said forward drive means and operation of said one-way first speed drive means in said auxiliary transmission for one-way first speed drive in both the main and auxiliary transmissions four wheel first speed drive and on upshift two-way second speed drive in said main transmission overrun discontinuing drive in said auxiliary transmission and in low range position to selectively establish said fluid operated two-way first speed drive means for two-way first speed drive at lower speeds with an upshift, at a predetermined higher speed than normal speed automatic upshift, to establish said fluid operated, two-way second speed drive means for second speed drive in said main transmission and with said manual valve means supplying said fluid operated forward drive means and operation of said one-way first speed drive means of said auxiliary transmission operative to provide a one-way first speed drive in said auxiliary transmission with two-way first speed drive in said transmission for a first speed four wheel drive and operative in response to upshift of said automatic shift control means of said main transmission to cause overrun and discontinue drive in the auxiliary transmission to provide two-way second speed main two wheel drive and in reverse position to provide two-way reverse drive in both transmission to provide four wheel reverse drive.

9. In a transmission assembly for two wheel and four wheel drives; an input, a main output; an auxiliary output; a main transmission driven by said input having fluid operated means providing first speed drive and second speed drive for driving said main output; an auxiliary transmission having first speed drive for driving said auxiliary output; a source of regulated fluid pressure; governor means connected to said main output providing a governor speed signal proportional to said main output speed; shift control means connected to said source, said governor means, said main transmission and said auxiliary transmission and operative in response to said governor speed signal to control said main transmission and said auxiliary transmission in one forward drive range position operative at low speeds to establish said first speed drive in said main transmission and at a predetermined higher speed to provide an automatic upshift to said second speed drive in said main transmission and to provide neutral in said auxiliary transmission during both said first speed drive and said second speed drive by said main transmission to provide first and second speed main two wheel drive and in another forward drive range position operative at low speeds to establish said first speed drive in said main transmission and said first speed drive in said auxiliary transmission to provide a first speed four wheel drive and operative at a predetermined higher speed to provide an automatic upshift to said second speed drive in said main transmission and in response to said automatic upshift in said main transmission to discontinue drive in said auxiliary transmission to provide a second speed main two wheel drive.

10. In a transmission assembly for two wheel and four wheel drives; an input, a main output; an auxiliary output; a main transmission driven by said input having fluid operated means providing a two-way drive, a first speed one-way drive and second speed drive for driving said main output; an auxiliary transmission having first speed drive for driving said auxiliary output; a source of regulated fluid pressure; governor means connected to said main output providing a governor speed signal proportional to said main output speed; shift control means connected to said source, said governor means, said main transmission and said auxiliary transmission and operative in a forward driving speed drive position in response to said governor speed signal to control said main transmission and said auxiliary transmission for said forward driving speed drive position operative at low speeds to establish said first speed one-way drive in said main transmission and said first speed drive in said auxiliary transmission to provide a first speed four wheel drive and operative at a predetermined higher speed to provide an automatic upshift to said second speed drive in said main transmission and in response to said automatic upshift in said main transmission to discontinue drive in said auxiliary transmission to provide said second speed main two wheel drive and in another drive position to establish said two-way drive in said main transmission and said first speed drive in said auxiliary transmission to provide another four wheel drive.

11. In a transmission assembly for two wheel and four wheel drives: an input, a main output; an auxiliary output; a main transmission driven by said input having fluid operated means providing a first speed one-way drive, a second speed drive and a two-way drive for one speed drive for driving said main output; an auxiliary transmission having drives including a two-way drive for said one speed drive for driving said auxiliary output; a source of regulated fluid pressure; governor means connected to said main output providing a governor speed signal proportional to said main output speed; shift control means connected to said source, said governor means, said main transmission and said auxiliary transmission and operative in a forward driving speed drive position in response to said governor speed signal to control said main transmission and said auxiliary transmission for said forward driving speed drive position operative at low speeds to establish said first speed one-way drive in said main transmission and a drive in said auxiliary transmission to provide a first speed four wheel drive and operative at a predetermined higher speed to provide an automatic upshift to said second speed drive in said main transmission and in response to said automatic upshift in said main transmission to discontinue drive in said auxiliary transmission to provide said second speed main two wheel drive and in another drive position to establish said two-way drive for one speed drive in said main transmission and said two-way drive for said one speed drive in said auxiliary transmission to provide another four wheel drive.

* * * * *

UNITED STATES PATENT AND TRADEMARK OFFICE
CERTIFICATE OF CORRECTION

PATENT NO. : 3,988,951
DATED : November 2, 1976
INVENTOR(S) : Alex C. Mair and Calvin F. Lundbom It is certified that error appears in the above-identified patent and that said Letters Patent are hereby corrected as shown below:

```
Column  3, line  9, change "round" to -- ground --;

Column  3, line 52, change "42" to -- 52 --.

Column  4, line 32, change "bring" to -- ring --;

Column  4, line 31, change "support" to -- supports --.

Column 13, line 35, change "216" to -- 215 --;

Column 13, line 36, change "215" to -- 216 --.

Column 14, line 18, before "129" insert -- passage --;

Column 14, line 19, delete "passage" (1st occurrence).

Column 16, line 62, change "32" to -- 3-2 --.

Column 21, line 36, change "361" to -- 36' --;

Column 21, line 43, change "361" to -- 36' --.

Column 23, line  2, after "plugs" insert -- a comma(,) --.

Column 25, line  5, before "127" insert -- passage --;

Column 25, line 21, before "passage" (1st occurrence)
                    insert -- Modulator I --.
```

UNITED STATES PATENT AND TRADEMARK OFFICE
CERTIFICATE OF CORRECTION

PATENT NO. : 3,988,951
DATED : November 2, 1976
INVENTOR(S) : Alex C. Mair and Calvin F. Lundbom It is certified that error appears in the above-identified patent and that said Letters Patent are hereby corrected as shown below:

Column 27, line 21, change "stated" to -- started --.

Column 29, line 36, change "32" to -- 320 --.

Column 37, line 64, before "transmission" insert -- main --.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*